United States Patent [19]

Tzikas

[11] Patent Number: 5,084,562
[45] Date of Patent: Jan. 28, 1992

[54] REACTIVE DYES CONTAINING A TRISAMINO-SUBSTITUTED TRIAZINYL MOIETY WHICH IS FURTHER SUBSTITUTED BY TWO VINYLSULFONYL-ALKYL- OR -ARYL-GROUPS

[75] Inventor: Athanassios Tzikas, Pratteln, Switzerland

[73] Assignee: Ciba-Geigy Corporation, Ardsley, N.Y.

[21] Appl. No.: 422,861

[22] Filed: Oct. 17, 1989

[30] Foreign Application Priority Data

Oct. 28, 1988 [CH] Switzerland ............ 4041/88

[51] Int. Cl.$^5$ ............ C09B 62/503; D06P 1/384; D06P 3/66
[52] U.S. Cl. ............ 534/618; 534/629; 534/641; 534/642; 540/126; 544/76; 544/187; 544/197; 544/198
[58] Field of Search ............ 534/618, 629, 635–638, 534/641–643; 540/126; 544/76, 187, 197, 198

[56] References Cited

U.S. PATENT DOCUMENTS

| | | | |
|---|---|---|---|
| 4,766,206 | 8/1988 | Tzikas | 534/643 X |
| 4,786,721 | 11/1988 | Tzikas et al. | 534/640 X |

FOREIGN PATENT DOCUMENTS

| | | | |
|---|---|---|---|
| 76782 | 4/1983 | European Pat. Off. | 534/638 |
| 0085025 | 8/1983 | European Pat. Off. | |
| 0085654 | 8/1983 | European Pat. Off. | |
| 0233139 | 8/1987 | European Pat. Off. | |
| 0264136 | 4/1988 | European Pat. Off. | |
| 0264137 | 4/1988 | European Pat. Off. | |
| 0266735 | 5/1988 | European Pat. Off. | |
| 0266774 | 5/1988 | European Pat. Off. | |
| 278904 | 8/1988 | European Pat. Off. | 534/638 |

*Primary Examiner*—Mary C. Lee
*Assistant Examiner*—Fiona T. Powers
*Attorney, Agent, or Firm*—George R. Dohmann; Edward McC. Roberts

[57] ABSTRACT

Reactive dyes which particularly suitable for dyeing or printing cellulose fiber material by the exhaust method or by continuous methods, which produce dyeing having good fastness properties in a high coloristic yield, having the formula

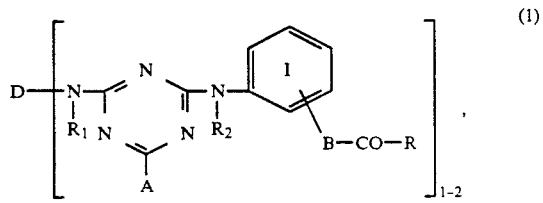

where D is the radical of a monoazo, polyazo, metal complex azo, anthraquinone, phthalocyanine, formazan, azomethine, dioxazine, phenazine, stilbene, triphenylmethane, xanthene, thioxanthone, nitroaryl, naphthoquinone, pyrenequinone or perylenetetracarbimide dye, $R_1$ and $R_2$ are independently of each other hydrogen or alkyl having 1 to 4 carbon atoms which may be substituted by halogen, hydroxyl, cyano, $C_1$–$C_4$alkoxy, $C_1$–$C_4$alkoxycarbonyl, carboxyl, sulfamoyl, sulfo or sulfato, B is a direct bond or a radical —$(CH_2)$—$_n$ or —O—$(CH_2)$—$_n$, n is 1, 2, 3, 4, 5 or 6, R is a radical of the formula

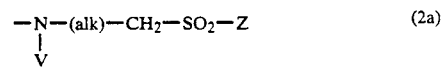

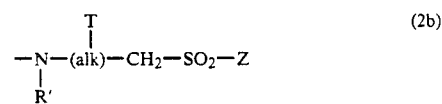

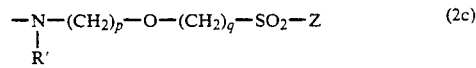

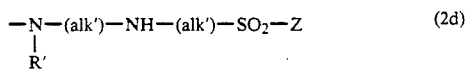

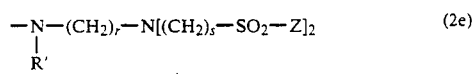

or

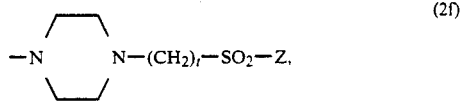

where R' is hydrogen or $C_1$–$C_6$alkyl, alk is alkylene having 1 to 7 carbon atoms or a branched isomer thereof, T is hydrogen, halogen, hydroxyl, sulfato, carboxyl, cyano, $C_2$–$C_4$alkanoyloxy, $C_1$–$C_4$alkoxycarbonyl, carbamoyl or a radical —$SO_2$—Z, V is hydrogen, substituted or unsubstituted $C_1$–$C_4$alkyl or a radical of the formula —(alk)—$CH_2$—$SO_2$—Z, where (alk) is as defined above, each alk' is indepedently of the other polymethylene having 2 to 6 carbon atoms or a branched isomer thereof, Z is β-sulfatoethyl, β-thiosulfatoethyl, β-phosphatoethyl, β-acyloxyethyl, β-haloethyl or vinyl, p, q, r and t are each independently of the others 1, 2, 3, 4, 5 or 6, s is 2, 3, 4, 5 or 6, and A is a radical of the formula

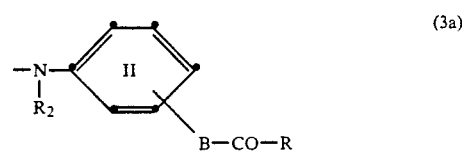

or
(Abstract continued on next page.)

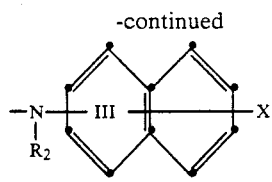

(3b)

where $R_2$, B and R are as defined above, X is a radical $-SO_2-Z$ or $-N(R_3)-SO_2Z$, where Z is as defined above, and $R_3$ is hydrogen, methyl or ethyl, or where A is a radical which is bonded directly to the triazine ring and has the formula (2a), (2b), (2c), (2d), (2e) or (2f) where R', T, alk, V, alk', Z, p, q, r, s and t are as defined above; if it is a radical of the formula (3a), A can be different from the corresponding radical in the formula (1) which includes the benzene nucleus I, and the benzene nuclei I and II or the benzene or naphthalene nucleus III may contain independently of one another further substituents.

33 Claims, No Drawings

REACTIVE DYES CONTAINING A TRISAMINO-SUBSTITUTED TRIAZINYL MOIETY WHICH IS FURTHER SUBSTITUTED BY TWO VINYLSULFONYL-ALKYL- OR -ARYL-GROUPS

The present invention relates to new improved reactive dyes which are suitable in particular for the dyeing of cellulose-containing fibre materials by the exhaust method or by the cold pad-batch method and which produce wet- and light-fast dyeings, to processes for preparing these dyes, and to the use thereof for dyeing and printing textile materials.

The present invention accordingly provides reactive dyes of the formula

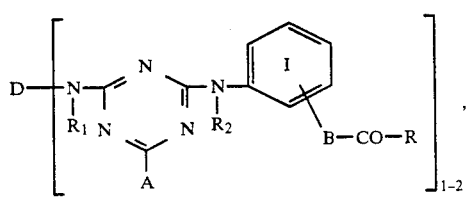

(1)

where D is the radical of a monoazo, polyazo, metal complex azo, anthraquinone, phthalocyanine, formazan, azomethine, dioxazine, phenazine, stilbene, triphenylmethane, xanthene, thioxanthone, nitroaryl, naphthoquinone, pyrenequinone or perylenetetracarbimide dye, $R_1$ and $R_2$ are independently of each other hydrogen or alkyl having 1 to 4 carbon atoms which may be substituted by halogen, hydroxyl, cyano, $C_1$-$C_4$alkoxy, $C_1$-$C_4$alkoxycarbonyl, carboxyl, sulfamoyl, sulfo or sulfato, B is a direct bond or a radical —(CH$_2$)—$_n$ or —O—(CH$_2$)—$_n$, n is 1,2,3,4,5 or 6, R is a radical of the formula $$-\text{N}(\text{V})-(\text{alk})-\text{CH}_2-\text{SO}_2-\text{Z}$$ (2a)

$$-\text{N}(\text{T})(\text{R}')-(\text{alk})-\text{CH}_2-\text{SO}_2-\text{Z}$$ (2b)

$$-\text{N}(\text{R}')-(\text{CH}_2)_p-\text{O}-(\text{CH}_2)_q-\text{SO}_2-\text{Z}$$ (2c)

$$-\text{N}(\text{R}')-(\text{alk}')-\text{NH}-(\text{alk}')-\text{SO}_2-\text{Z}$$ (2d)

$$-\text{N}(\text{R}')-(\text{CH}_2)_r-\text{N}[(\text{CH}_2)_s-\text{SO}_2-\text{Z}]_2$$ (2e)

or

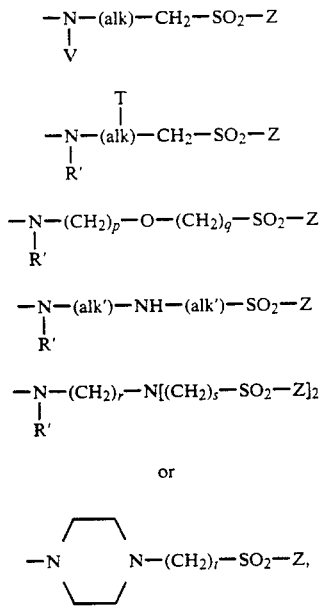

(2f)

wherein R' is hydrogen or $C_1$-$C_6$alkyl, alk is alkylene having 1 to 7 carbon atoms or a branched isomer thereof, T is hydrogen, halogen, hydroxyl, sulfato, carboxyl, cyano, $C_2$-$C_4$alkanoyloxy, $C_1$-$C_4$alkoxycarbonyl, carbamoyl or a radical —SO$_2$—Z, V is hydrogen, substituted or unsubstituted $C_1$-$C_4$alkyl or a radical of the formula —(alk)—CH$_2$—SO$_2$—Z, where (alk) is as defined above, each alk' is independently of the other polymethylene having 2 to 6 carbon atoms or a branched isomer thereof, Z is β-sulfatoethyl, β-thiosulfatoethyl, β-phosphatoethyl, β-acyloxyethyl, β-haloethyl or vinyl, p, q, r and t are each independently of the others 1, 2, 3, 4, 5 or 6s is 2, 3, 4, 5 or 6, and A is a radical of the formula $$-\text{N}(\text{R}_2)-\text{II}-\text{B}-\text{CO}-\text{R}$$ (3a)

or $$-\text{N}(\text{R}_2)-\text{III}-\text{X}$$ (3b)

where $R_2$, B and R are as defined above, X is a radical —SO$_2$—Z or —N(R$_3$)—SO$_2$Z, where Z is as defined above, and $R_3$ is hydrogen, methyl or ethyl, or where A is a radical which is bonded directly to the triazine ring and has the formula (2a), (2b), (2c), (2d), (2e) or (2f) where R', T, alk, V, alk', Z, p, q, r, s and t are as defined above; if it is a radical of the formula (3a), A can be different from the corresponding radical in the formula (1) which includes the benzene nucleus I, and the benzene nuclei I and II or the benzene or naphthalene nucleus III can contain independently of one another further substituents.

The radical D in the formula (1) may contain customary organic dye substituents bonded to its basic skeleton.

Examples of further substituents on the radical D are: alkyl groups having 1 to 4 carbon atoms, such as methyl, ethyl, propyl, isopropyl or butyl, alkoxy groups having 1 to 4 carbon atoms, such as methoxy, ethoxy, propoxy, isopropoxy or butoxy, acylamino groups having 1 to 8 carbon atoms, in particular alkanoylamino groups and alkoxycarbonylamino groups having 2 to 8 carbon atoms, such as acetylamino, propionylamino, methoxycarbonylamino, ethoxycarbonylamino or benzoylamino, amino, alkylamino having 1 to 4 carbon atoms, such as methylamino, ethylamino, propylamino, isopropylamino or butylamino, phenylamino, N,N-di-β-hydroxyethylamino, N,N-di-β-sulfatoethylamino, sulfobenzylamino, N,N-disulfobenzylamino, alkoxycarbonyl having 1 to 4 carbon atoms in the alkoxy radical, such as methoxycarbonyl or ethoxycarbonyl, alkylsulfonyl having 1 to 4 carbon atoms, such as methylsulfonyl or ethylsulfonyl, alkanoyl having 2 to 4 carbon atoms, such as acetyl, propionyl or butylryl, trifluoromethyl, nitro, cyano, halogen, such as fluorine, chlorine or bromine, carbamoyl, N-alkylcarbamoyl having 1 to 4 carbon atoms in the alkyl radical, such as N-methylcarbamoyl or N-ethylcarbamoyl, sulfamoyl, N-alkylsulfamoyl having 1 to 4 carbon atoms, such as N-methylsulfamoyl, N-ethylsulfamoyl, N-propylsulfamoyl, N-isopropylsulfamoyl or N-butylsulfamoyl, N-(β-hydroxyethyl)sulfamoyl, N,N-di-(β-hydroxyethyl)sulfamoyl, N-phenylsulfamoyl, ureido, hydroxyl, carboxyl, sulfomethyl and sulfo. Preferably, the radical D contains one or more sulfonic acid groups. Reactive dyes of the formula (1) where D is the radical of an azo dye contain as substituents in particular methyl, ethyl, methoxy, ethoxy, acetylamino, benzoylamino, amino, chlorine, bromine, ureido, hydroxyl, carboxyl, sulfomethyl or sulfo.

Alkyl $R_1$ or $R_2$ in the formula (1) and alkyl $R_2$ in the formulae (3a) and (3b) are straight-chain or brnached; the alkyl can be further substituted, for example by halogen such as fluorine, chlorine or bromine, hydroxyl, cyano, $C_{1-4}$alkoxy, such as methoxy or ethoxy, $C_{1-4}$-alkoxycarbonyl, such as methoxycarbonyl, carboxyl, sulfamoyl, sulfo or sulfato. Examples of alkyls $R_1$ and $R_2$ are: methyl, ethyl, propyl, isopropyl, butyl, isobutyl, sec-butyl, tert-butyl, carboxymethyl, $\beta$-carboxyethyl, $\beta$-carboxypropyl, methoxycarbonylmethyl, ethoxycarbonylmethyl, $\beta$-methoxyethyl, $\beta$-ethoxyethyl, $\beta$-methoxypropyl, $\beta$-chloroethyl, $\gamma$-bromopropyl, $\beta$-hydroxybutyl, $\beta$-cyanoethyl, sulfomethyl, $\beta$-sulfoethyl, aminosulfonylmethyl and $\beta$-sulfatoethyl. Preferably, $R_1$ and $R_2$ are each hydrogen, methyl or ethyl.

The radical B contains 1 to 6, preferably 1 to 4, carbon atoms; examples of B are: methylene, ethylene, propylene, butylene, methyleneoxy, ethyleneoxy, propyleneoxy and butyleneoxy. Radical B of the structure $-O-(CH_2)_n$ is bonded to the benzene ring by the oxygen atom. Preferably, B is a direct bond.

Suitable $\beta$-haloethyl Z is in particular $\beta$-chloroethyl, and suitable $\beta$-acyloxyethyl Z is in particular $\beta$-acetoxyethyl. The alkylene radical alk is preferably methylene, ethylene, methylmethylene, propylene or butylene. Alkanoyloxy T is is particular acetyloxy, propionyloxy or butyryloxy, and alkoxycarbonyl T is in particular methoxycarbonyl, ethoxycarbonyl or propoxycarbonyl. Alkyl V can be methyl, ethyl, propyl, isopropyl, butyl, isobutyl, sec-butyl or tert-butyl. Derivatives of carboxyl and sulfo are for example carbamoyl, N-methylcarbamoyl, N-ethylcarbamoyl, N,N-dimethylcarbamoyl, N,N-diethylcarbamoyl, cyano, acetyl, propionyl, butyryl, methoxycarbonyl, ethoxycarbonyl, propyloxycarbonyl, sulfamoyl, N-methylsulfamoyl, N-ethylsulfamoyl, N,N-dimethylsulfamoyl, N,N-diethylsulfamoyl, methylsulfonyl, ethylsulfonyl and propylsulfonyl. The radical $R_1$ is for example methyl, ethyl, propyl, isopropyl, butyl, isobutyl, sec-butyl, tert-butyl, pentyl or hexyl, or preferably hydrogen. The polymethylene radicals alk' are preferably ethylene, propylene or butylene. The indices p, q and t independently of one another are preferably 2, 3 or 4. The indices r and s independently of each other are preferably 2.

With T as $-SO_2-Z$ and R' as hydrogen, the radical of the formula (2b) preferably has the form

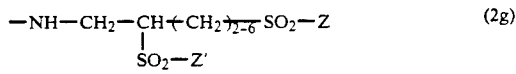 (2g)

where Z and Z' are independently of each other $\beta$-sulfatoethyl, $\beta$-thiosulfatoethyl, $\beta$-phosphatoethyl, $\beta$-acyloxyethyl, $\beta$-haloethyl or vinyl. An important variation upon this radical is:

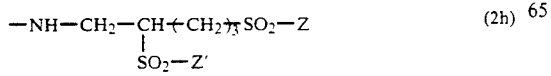 (2h)

where Z is Z' and Z/Z' is as defined above; Z/Z' is in particular $\beta$-sulfatoethyl, $\beta$-chloroethyl or vinyl.

The benzene ring I inside the square brackets of the formula (1), the benzene ring II in the formula (3a), and the benzene or naphthalene ring system III in the formula (3b) may contain further substituents, for example the same substituents as mentioned above as part of the elucidation of the radical D.

It is also necessary to contemplate reactive dyes of the formula (1) where the radical D includes a further reactive radical. The additional reactive radicals included in D can be bonded to D via amino groups or in some other way, for example by a direct bond.

The square brackets in the formula (1) enclose a reactive radical, of which there may be one or two in the molecule; the two options are equally important. If two reactive radicals are present, they may be identical or different; preferably the two radicals are identical.

Preferred embodiments of reactive dyes of the formula (1) are:

a) reactive dyes of the formula

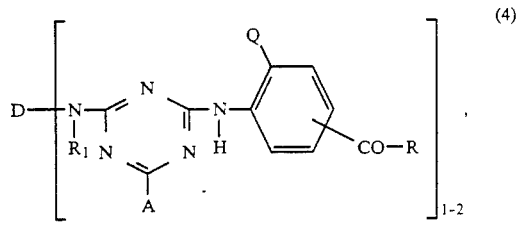 (4)

where D and R are as defined under the formula (1), $R_1$ is hydrogen, methyl or ethyl, Q is hydrogen, $C_1-C_4$alkyl, $C_1-C_4$alkoxy, halogen, carboxyl or sulfo, and A is a radical of the formula

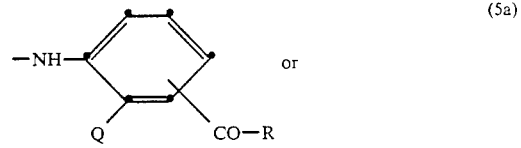 (5a)

or

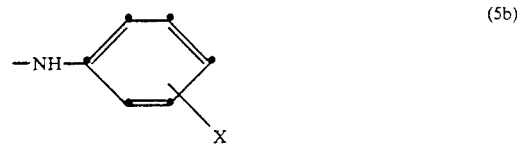 (5b)

where Q is as defined above, and R and X are as defined under the formula (1), or A, if it is a radical of the formula (5a), can be different from the corresponding radical present in the formula (4);

b) reactive dyes of the formula (4) where D and $R_1$ are as defined under the formula (4), Q is hydrogen or sulfo, R is a radical of the formula (2a), (2b), (2c), (2d), (2e) or (2f), where Z is $\beta$-sulfatoethyl, $\beta$-chloroethyl or vinyl, and X is $\beta$-sulfatoethylsulfonyl or vinylsulfonyl;

c) reactive dyes of the formula (4) where R is a radical of the formula

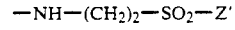 $-NH-(CH_2)_2-SO_2-Z'$

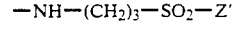 $-NH-(CH_2)_3-SO_2-Z'$

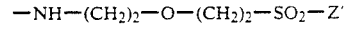 $-NH-(CH_2)_2-O-(CH_2)_2-SO_2-Z'$

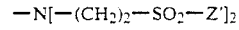 $-N[-(CH_2)_2-SO_2-Z']_2$

-continued $$-\underset{\underset{CH_3}{|}}{N}-(CH_2)_2-SO_2-Z'$$

$$-\underset{\underset{C_2H_5}{|}}{N}-(CH_2)_2-SO_2-Z'$$

$$-NH-CH_2-\underset{\underset{SO_2-Z'}{|}}{CH}-CH_2-CH_2-CH_2-SO_2-Z' \text{ or}$$

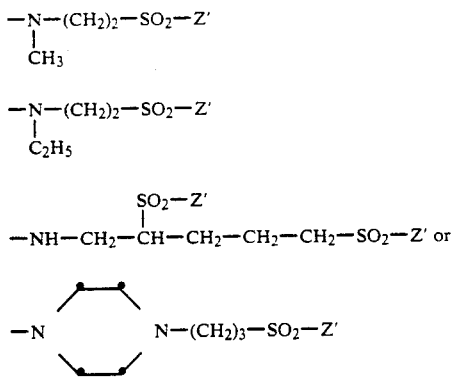

where Z' is β-sulfatoethyl, β-chloroethyl or vinyl; and d) reactive dyes of the formula (4) where R and A are independently of each other a radical of the formula $$-NH-(CH_2)_2-SO_2-Z'$$

$$-NH-(CH_2)_3-SO_2-Z'$$

$$-NH-(CH_2)_2-O-(CH_2)_2-SO_2-Z'$$

$$-N[-(CH_2)_2-SO_2-Z']_2$$

$$-\underset{\underset{CH_3}{|}}{N}-(CH_2)_2-SO_2-Z'$$

$$-\underset{\underset{C_2H_5}{|}}{N}-(CH_2)_2-SO_2-Z'$$

$$-NH-CH_2-\underset{\underset{SO_2-Z'}{|}}{CH}-CH_2-CH_2-CH_2-SO_2-Z' \text{ or}$$

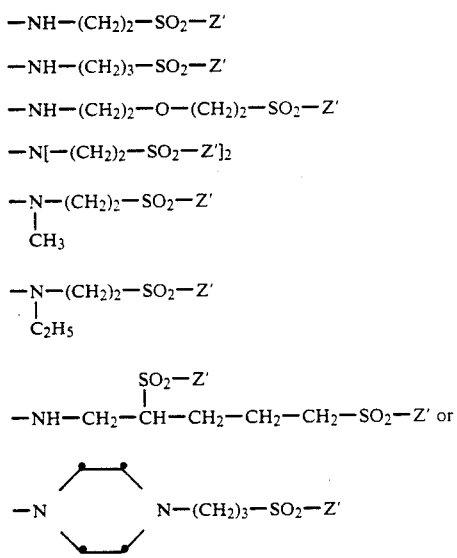

where Z' is β-sulfatoethyl, β-chloroethyl or vinyl, and where D and $R_1$ are as defined under the formula (4) and Q is hydrogen or sulfo. Preferably, $R_1$ is hydrogen.

Particular preference is given to:

e) reactive dyes of the formula (1) or (4) where D is the radical of a monoazo or disazo dye;

f) reactive dyes of the formula (1) or (4) where D is the radical of a metal complex azo or formazan dye;

g) reactive dyes of the formula (1) or (4) where D is the radical of an anthraquinone dye;

h) reactive dyes of the formula (1) or (4) where D is the radical of a phthalocyanine dye;

i) reactive dyes of the formula (1) or (4) where D is the radical of a dioxazine dye;

j) reactive dyes as per f) where D is the radical of a 1:1 copper complex azo dye of the benzene or naphthalene series and the copper atom is bonded on either side to a metallizable group ortho to the azo bridge.

Very particular preference is given to:

k) reactive dyes as per e) where D is a monoazo or disazo dye radical of the formula $$D_1-N=N-(M-N=N)_u-K- \quad (6a).$$

$$-D_1-N=N-(M-N=N)_u-K \quad (6b),$$

or $$-D_1-N=N-(M-N=N)_u-K- \quad (6c),$$

or of a metal complex derived therefrom, $D_1$ is the radical of a diazo component of the benzene or naphthalene series, M is the radical of a middle component of the benzene or naphthalene series, and K is the radical of a coupling component of the benzene, naphthalene, pyrazolone, 6-hydroxy-2-pyridone or acetoacetarylamide series, $D_1$, M and K being unsubstituted or substituted by customary azo dye substituents, in particular hydroxyl, amino, methyl, ethyl, methoxy or ethoxy groups, substituted or unsubstituted alkanoylamino groups having 2 to 4 carbon atoms, substituted or unsubstituted benzoylamino groups or halogen atoms, u is 0 or 1, and $D_1$, M and K together contain at least two sulfo groups, preferably threee or four sulfo groups.

Very particular preference is likewise given to:

l) reactive dyes as per e) where D is a disazo dye radical of the formula $$-D_1-N=N-K-N=N-D_2 \quad (7a),$$

or $$-D_1-N=N-K-N=N-D_2- \quad (7b),$$

where $D_1$ and $D_2$ are independently of each other the radical of a diazo component of the benzene or naphthalene series, and K is the radical of a coupling component of the naphthalene series, $D_1$, $D_2$ and K being unsubstituted or carrying customary azo dye substituents, in particular hydroxyl, amino, methyl, ethyl, methoxy or ethoxy groups, substituted or unsubstituted alkanoylamino groups having 2 to 4 carbon atoms, substituted or unsubstituted benzoylamino groups or halogen atoms, and $D_1$, $D_2$ and K together contain at least two sulfo groups, preferably three or four sulfo groups.

Of importance are:

m) reactive dyes as per f) where D is the radical of a formazan dye of the formula

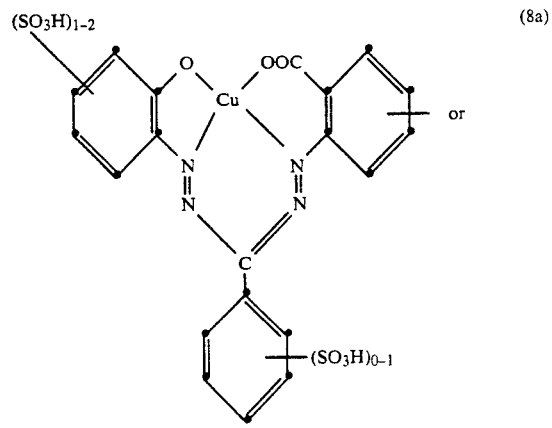

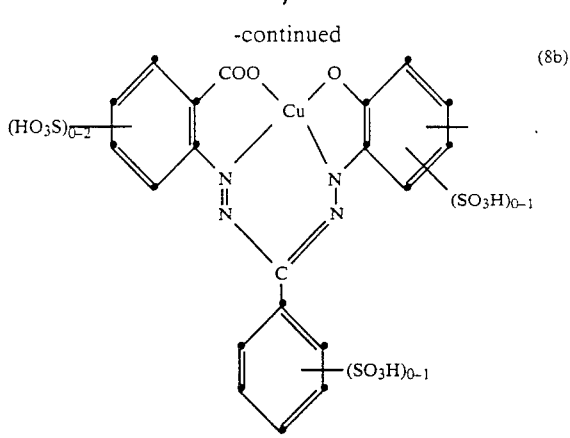
(8b)

where the benzene nuclei may be further substituted by akyl having 1 to 4 carbon atoms, alkoxy having 1 to 4 carbon atoms, alkylsulfonyl having 1 to 4 carbon atoms, halogen or carboxyl;

n) reactive dyes as per g) where D is the radical of an anthraquinone dye of the formula (9)

substituted by alkyl having 1 to 4 carbon atoms, alkoxy having 1 to 4 carbon atoms, alkoxy having 1 to 4 carboxy atoms, halogen, carboxyl or sulfo, and the dye preferably contains at least 2 strongly water-solubilizing groups;

o) reactive dyes as per h) where D is the radical of a phthalocyanine dye of the formula

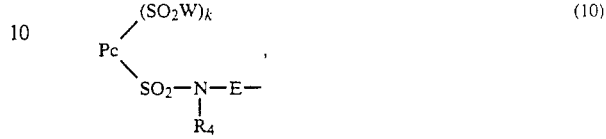
(10)

where Pc is the radical of a copper or nickel phthalocyanine, W is —OH and/or —$NR_5R_6$, $R_5$ and $R_6$ are independently of each other hydrogen or alkyl having 1 to 4 carbon atoms which may be substituted by hydroxyl or sulfo, $R_4$ is hydrogen or alkyl having 1 to 4 carbon atoms, E is a phenylene radical which may be substituted by alkyl having 1 to 4 carbon atoms, halogen, carboxyl or sulfo, or is an alkylene radical having 2 to 6 carbon atoms, preferably a sulfophenylene or ethylene radical, and k is 1, 2 or 3;

p) reactive dyes as per i) where D is the radical of a dioxazine dye of the formula

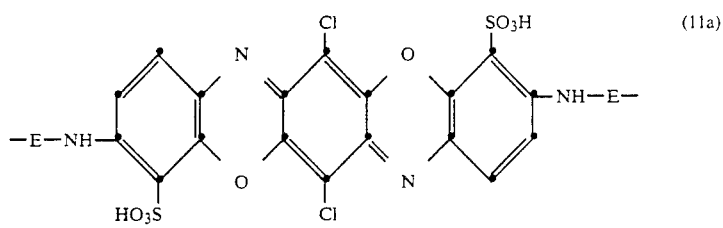
(11a)

or

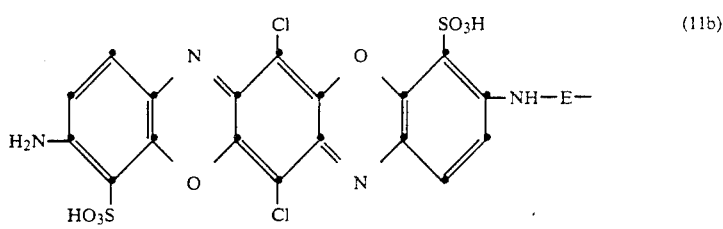
(11b)

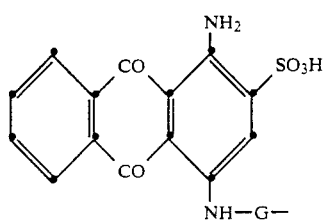

where G is a phenylene, cyclohexylene or $C_2$–$C_6$alkylene radical; the anthraquinone nucleus may be substituted by a further sulfo group and phenyl G may be where E is a phenylene radical which may be substituted by alkyl having 1 to 4 carbon atoms, halogen, carboxyl or sulfo or is an alkylene radical having 2 to 6 carbon atoms, and the outer benzene rings in the formulae (11a) and (11b) may be further substituted by alkyl having 1 to 4 carbon atoms, alkoxy having 1 to 4 carbon atoms, acetylamino, nitro, halogen, carboxyl or sulfo.

Of the very particularly preferred reactive dyes as per k) or l), particular importance attaches to the dyes of the following formulae (12) to (23):

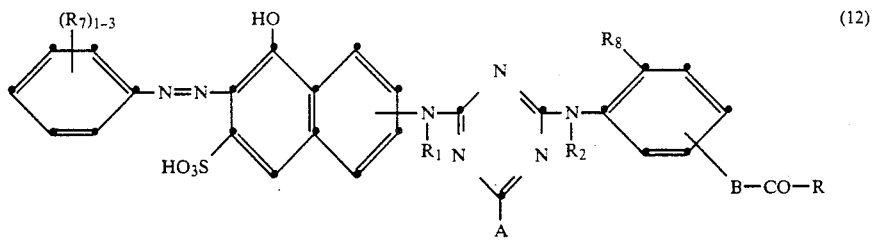

where $(R_7)_{1-3}$ is 1 to 3 substituents from the group consisting of $C_{1-4}$alkyl, $C_{1-4}$alkoxy, halogen, carboxyl and sulfo, $R_8$ is hydrogen, $C_{1-4}$alkyl, $C_{1-4}$alkoxy, halogen, hydroxyl, carboxyl or sulfo, and $R_1$, $R_2$, A, B and R as defined under the formula (1);

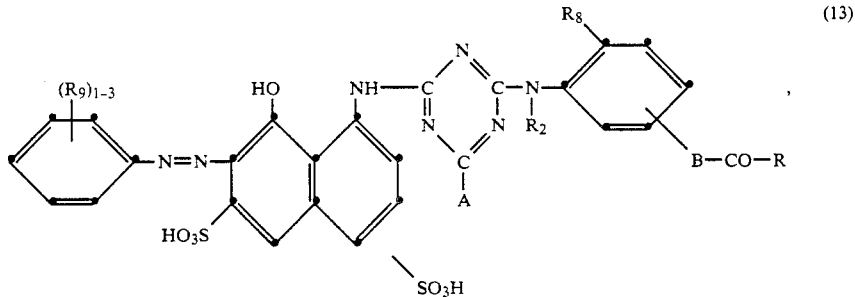

where $(R_9)_{1-3}$ is 1 to 3 substituents from the group consisting of $C_{1-4}$alkyl, $C_{1-4}$alkoxy, halogen, carboxyl and sulfo, and $R_2$, A, B, R and $R_8$ are as defined under the formula (12);

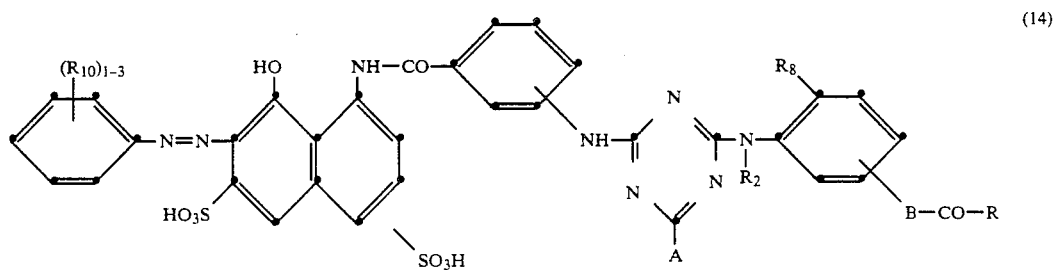

where $(R_{10})_{1-3}$ is 1-3 substituents from the group consisting of $C_{1-4}$alkyl, $C_{1-4}$alkoxy, halogen, carboxyl and sulfo, and $R_2$, A, B, R and $R_8$ are as defined under the formula (12);

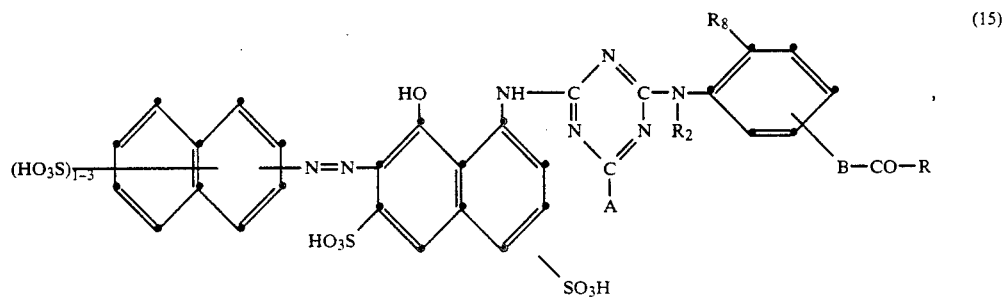

where $R_2$, A, B, R and $R_8$ are as defined under the formula (12);

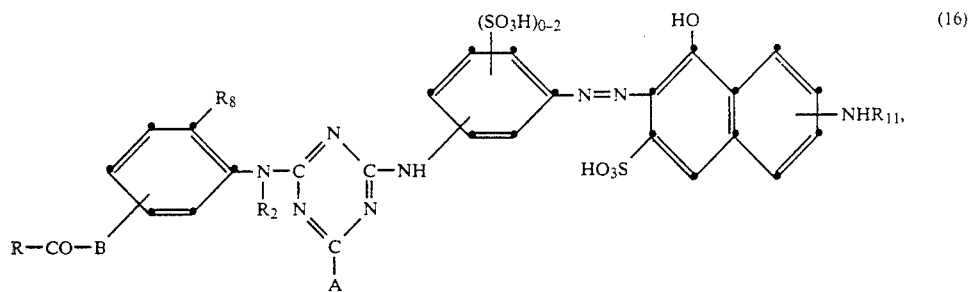

where $R_{11}$ is $C_{2-4}$alkanoyl or benzoyl, and $R_2$, A, B, R and $R_8$ are as defined under the formula (12);

sulfo, and $R_2$, A, B, R and $R_8$ are as defined under the formula (12);

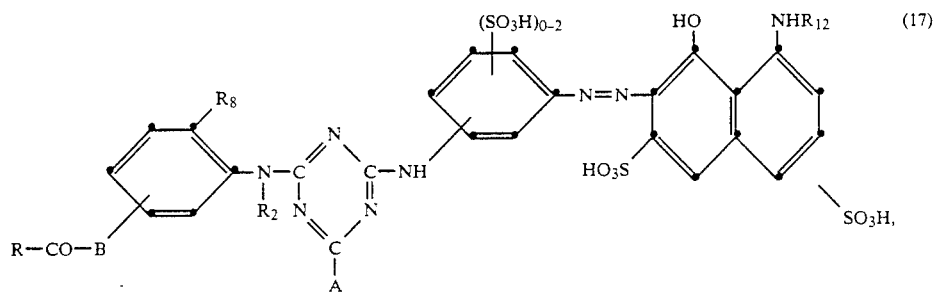

where $R_{12}$ is $C_{2-4}$alkanoyl or benzoyl, and $R_2$, A, B, R and $R_8$ are as defined under the formula (12);

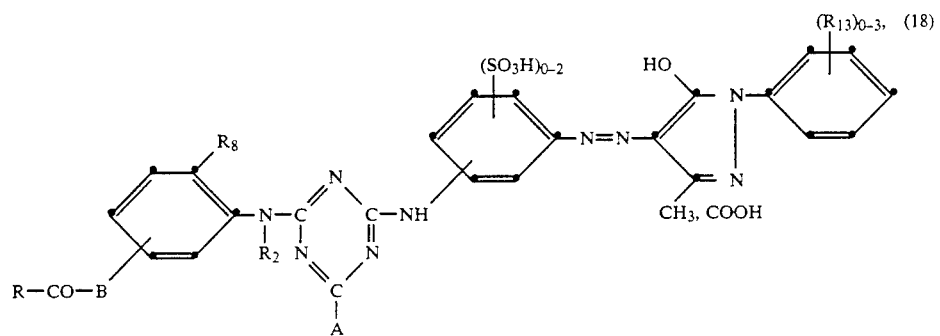

where $(R_{13})_{0-3}$ is 3 substituents from the group consisting of $C_{1-4}$alkyl, $C_{1-4}$alkoxy, halogen, carboxyl and where $R_{14}$ and $R_{15}$ are independently of each other hydrogen, $C_{1-4}$alkyl or phenyl, $R_{16}$ is hydrogen, cyano, carbamoyl or sulfomethyl, and $R_2$, A, B, R and $R_8$ are as defined under the formula (12);

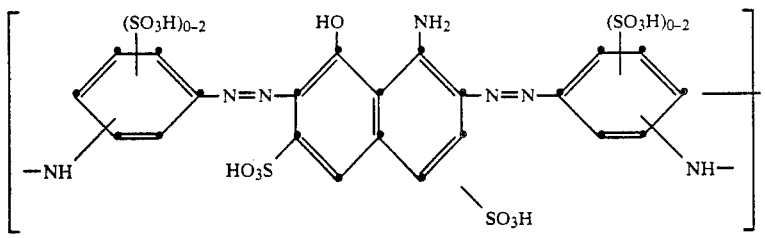

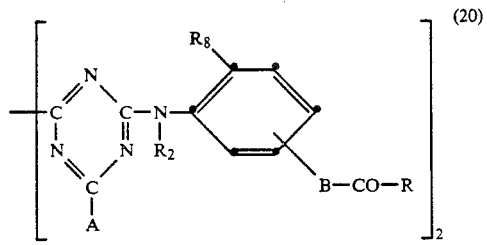

where R₂, A, B, R and R₈ are as defined under the formula (12);

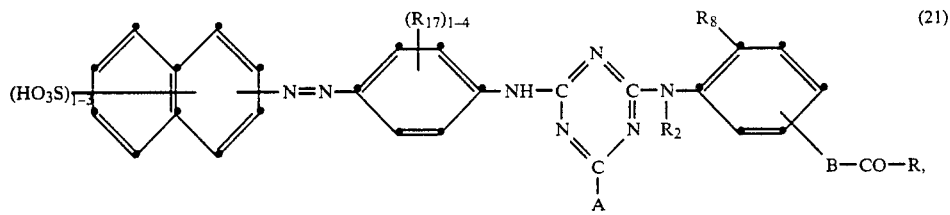

where $(R_{17})_{1-4}$ is 1 to 4 substituents selected independently of one another from the group consisting of hydrogen, halogen, nitro, cyano, trifluoromethyl, sulfamoyl, carbamoyl, $C_{1-4}$alkyl, $C_{1-4}$alkoxy, amino, acetylamino, ureido, hydroxyl, carboxyl, sulfomethyl and and sulfo, and R₂, A, B, R and R₈ are as defined under the formula (12);

where A, B, R, R₂ and R₈ are as defined under the formula (12), $(R_{18})_{0-3}$, $(R_{18}')_{0-2}$ and $(R_{18}'')_{0-2}$ are independently of one another 0 to 3 or 0 to 2 substituents from the group consisting of $C_{1-4}$alkyl, $C_{1-4}$alkoxy and sulfo.

Preference is also given to heavy metal complexes of reactive dyes of the formula (1); suitable complexable heavy metals are in particular copper, nickel, cobalt and chromium.

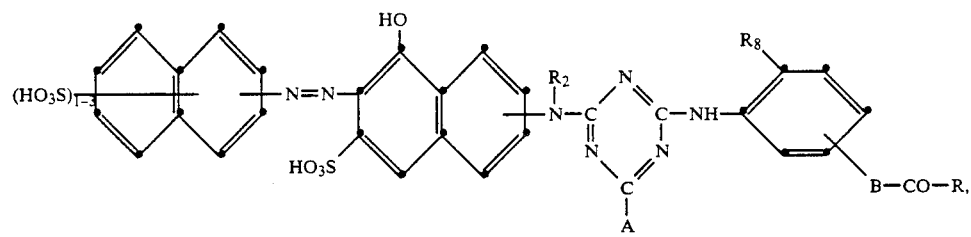

where A, B, R, R₂ and R₈ are as defined under the formula (12); and

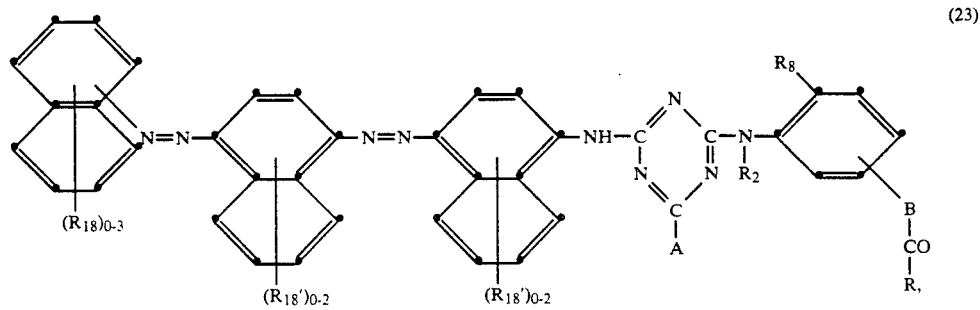

Preference is given in particular to reactive dyes of the formulae (1) to (23) where Z is β-sulfatoethyl, β-chloroethyl or vinyl.

Particular preference is given to reactive dyes of the formula (12) to (23) where $R_2$ is hydrogen or where $R_1$ and $R_2$ is hydrogen and/or $R_8$ is hydrogen or sulfo and/or B is a direct bond and/or R is a radical of the formula

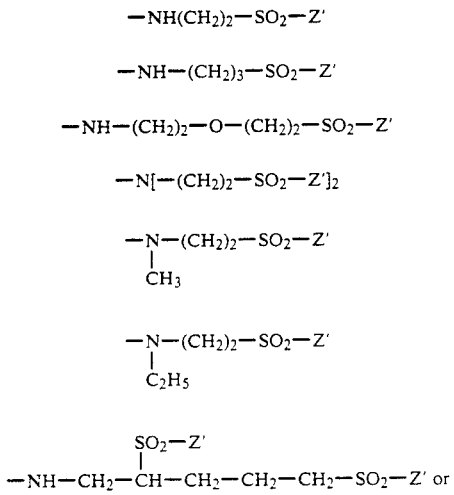

where Z' is β-sulfatoethyl, β-chloroethyl or vinyl, and/or A is a radical of the formula

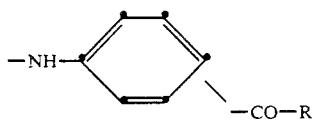

where R is as defined above, or is of the formula

where X is $-SO_2-Z'$ and Z' is as defined above, or is of the formula

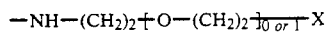

where X is as defined above.

The present invention further provides a process for preparing a reactive dye of the formula (1), which comrises introducing in a conventional manner into an organic dye which contains a radical D, or into a dye precursor, one or two radicals of the formula

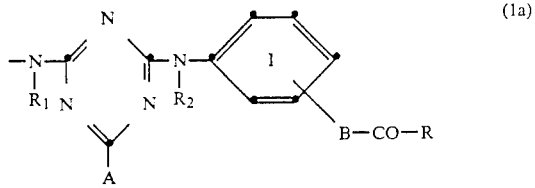

where $R_1$, $R_2$, B, R and A are as defined under the formula (1), or, if a dye precursor is used, converting the intermediate obtained into the desired end dye, and if necessary following up with a further conversion reaction.

The molar ratio of the starting materials must be chosen to corresponds to the composition of the end product, i.e. according to whether only one radical or two radicals of the formula (1a) is or are to be present in the reactive dye of the formula (1).

If necessary, the process according to the invention is concluded with a further conversion reaction. If the end dye is prepared from a precursor, this conversion reaction takes the particular form of a coupling reaction leading to azo dyes.

the introduction of one or two radicals of the formula (1a) can also be carried out step by step; for instance, the reactive dyes of the formula (1) are obtained for example by reacting an organic dye of the formula

or a dye precursor, at least one equivalent of an s-triazine of the formula

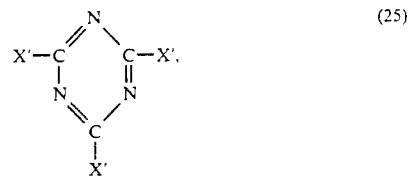

at least one equivalent of an amine of the formula

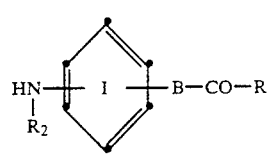

an optionally at least one equivalent of an amine of the formula

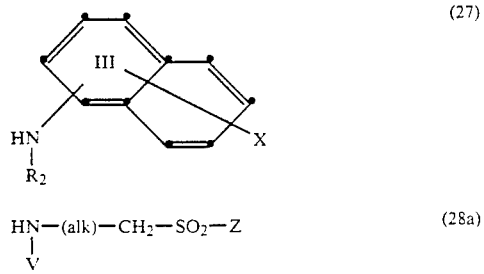

-continued

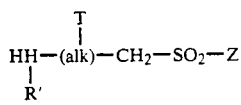
(28b)

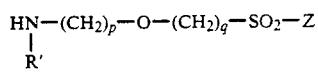
(28c)

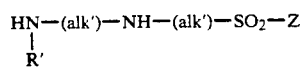
(28d)

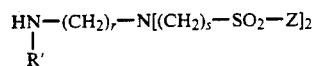
(28e)

or

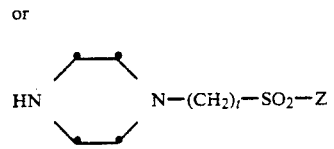
(28f)

in any desired order to give a reactive dye of the formula (1) where D, R₁, R₂, B, R, alk R', T, V, p, q, r, s, t, Z and X are as defined under the formula (1) and each X' is independently of the others halogen, or, if dye precursors are used, by converting the intermediates obtained into the desired end dyes.

The benzo rings indicated by broken lines in the formulae (3b), (23) and (27) indicate a benzo ring which may be fused to the solid-line phenyl, so that the dyes contain phenyl or naphthyl as a matter of choice.

Since the individual steps indicated above may be carried out in various orders, in some instances even simultaneously, various embodiments are possible. In general, the reaction is carried out in successive steps in which the sequence of the elementary reactions between the individual reactants advantageously depends on the particular conditions.

One factor here is the structure of the starting materials, which determines which of the possible embodiments gives the best results or under which specific conditions, for example at which condensation temperature, the reaction is best carried out.

Since hydrolysis of a halotriazine radical may occur under certain conditions, an intermediate which contains acetylamino groups must be hydrolyzed (to eliminate the acetyl groups) before it is condensed with a halotriazine. Which reaction, for example in the preparation of a secondary condensation product form a compound of the formula (24) and possibly (27) or (28a), (28b), (28c), (28d), (28e) or (28f), the triazine and the organic dye or a precursor, is advantageously carried out first, namely that of the triazine with the compound of the formula (26) or (27) or (28a), (28b), (28c), (28d), (28e) or (28f) or with the organic dye or a precursor of the dye, will vary from case to case and depends in particular on the solubility of the amino compounds involved and on the basicity of the amino groups to be acylated.

The reactive dyes of the formula (1) where A is a radical of the formula (3a) are prepared by using for example two equal equivalents of an amine of the formula (26) or by using one equivalent each of two different amines of the formula (26).

A further embodiment of the process according to the invention comprises first condensing a dye of the formula (24) with a reactive derivative of the s-triazine of the formula

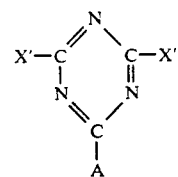
(29)

and then condensing the resulting compound of the formula

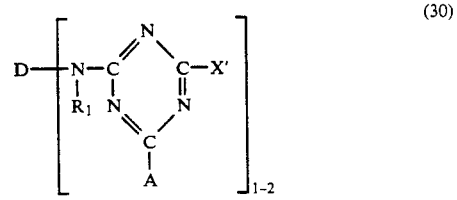
(30)

with an amine of the formula (26) to give a reactive dye of the formula (1) where D, A, R₁ and X' are as defined above.

In a further embodiment of the process according to the invention, the reactive dyes of the formula (1) can be prepared by reacting a component of this dye which contains at least one radical of the formula

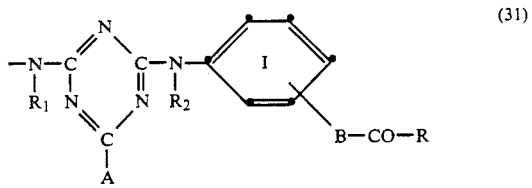
(31)

where R, R₁, R₂, B and X' are as defined above, with a second component required for preparing the dye which may contain a radical of the formula (31), and condensing the resulting dye with an amine of the formula (26) or (27) or with one of the amines of the formulae (28a) to (28f).

A modifying embodiment of the process comprises first preparing a dye which contains a precursor of the reactive radical and subsequently converting this precursor stage into the end stage, for example by esterification or an addition reaction. For example, a dye where Z is HO—CH₂CH₂— can be prepared and the intermediate be reacted with sulfuric acid before or after the acylation, thereby converting the hydroxyl group into a sulfato group, or use is made of a similar dye where Z is H₂C=CH— and thiosulfuric acid is added to the intermediate to form a radical of the form HO₃SS—CH₂CH₂—. The hydroxyl group in a dye of the formula (1) or a suitable precursor is sulfated for example by reaction with concentrated sulfuric acid at 0° C. to moderately elevated temperature. The sulfation can also be carried out by reacting the hydroxy compound with two equivalents of chlorosulfuric acid per hydroxyl group in a polar organic solvent, for example N-methylpyrrolidone, at 10° to 80° C. Preferably, the sulfation is effected by adding the compound in question to sulfuric acid monohydrate at temperatures between 5° and 15° C. The introduction of another radical for Z into a compound of the formula (1) or into an intermediate in place of a halogen atom or in place of the sulfato group, for example a thiosulfato or phosphato group, is effected in a manner known per se. The preparation via an intermediate stage of radical is in many cases uniform and complete.

The synthesis may also be followed by elimination reactions. For instance, reactive dyes of formula (1) which contain sulfatoethylsulfonyl radicals may be treated with agents which eliminate hydrogen halide, such as sodium hydroxide, to convert the sulfatoethylsulfonyl radicals into vinylsulfonyl radicals.

Basically, reactive dyes of the formula (1) of all classes of dyes are preparable in a manner analogous to known methods by starting from precursors or intermediates for dyes which contain fibre-reactive radicals conforming to the formula (1) or by introducing these fibre-reactive radicals into suitable intermediates of dye character.

Preference is givne to reactive dyes of the formula (1) where D is the radical of a monoazo or disazo dye or of a metal complex azo dye. In this case, the radicals of the formula (1a) are bonded to the diazo and/or coupling components. If a reactive dye of the formula (1) contains two radicals of the formula (1a), preferably one radical each of the formula (1a) is bonded to a component, i.e. to a diazo component or to a coupling component. Reactive dyes thus have for example the formulae

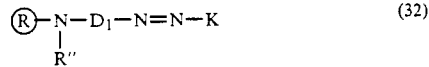  (32)

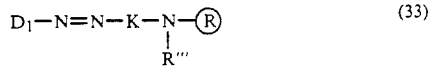  (33)

and

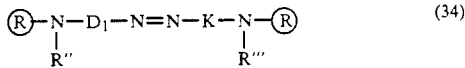  (34)

where R" and R''' are independently of each other defined in the same way as $R_1$ in the formula (1), $D_1$ is the radical of a diazo component, K is the radical of a coupling component, and (R) is a reactive radical of the formula (1a).

Reactive dyes of the formula (1) are obtained for example, starting from dye precursors, by condensing a component of the dye of the formula (24) which contains a —N($R_1$)H group and a triazine of the formula (29), condensing beforehand or afterwards with a compound of the formula (26), and reacting with the other component of the dye of the formula (24). In the preparation of the preferred azo dyes, the diazo components and coupling components must together contain at least one amino group —N($R_1$)H— and many contain further amino groups. In this case, the diazo components used are in particular 1,3-phenylenediamine-4-sulfonic acid, 1,4-phenylenediamine-2-sulfonic acid, 1,4-phenylenediamine-2,5-disulfonic acid and 1,3-phenylenediamine-4,6-disulfonic acid. It is possible to use the corresponding acetylamino or nitro compounds in which the acetylamino or nitro group is converted by hydrolysis or reduction into an $H_2N$— group prior to the condensation with the triazine of the formula (29).

If groups capable of metal complex formation, such as hydroxyl, carboxyl, amino or sulfo, are present in the reactive dyes prepared, the reactive dyes can subsequently also be metallated. Metal complex azo dyes are obtained for example by treating azo compounds which have been obtained according to the invention and which contain complexing groups, for example hydroxyl or carboxyl groups, in the ortho-ortho' position relative to the azo bridge with heavy metal donor compounds before or if desired even after the condensation with the triazine of the formula (17). Of particular interest are copper complexes of reactive dyes of the formula (1). Other possible methods of metallation aside from that mentioned above are dealkylating metallation and, for the preparation of copper complexes, oxidative coppering.

The most important versions of the process are depicted in the illustrative examples.

In what follows, possible starting materials for use in the preparation of the reactive dyes of the formula (1) will be specified.

Organic dyes of the formula (24)

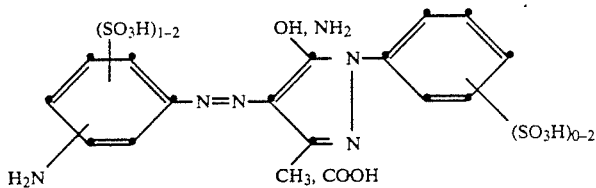

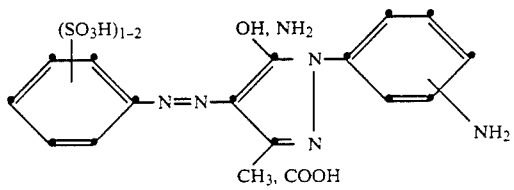

-continued
Organic dyes of the formula (24)
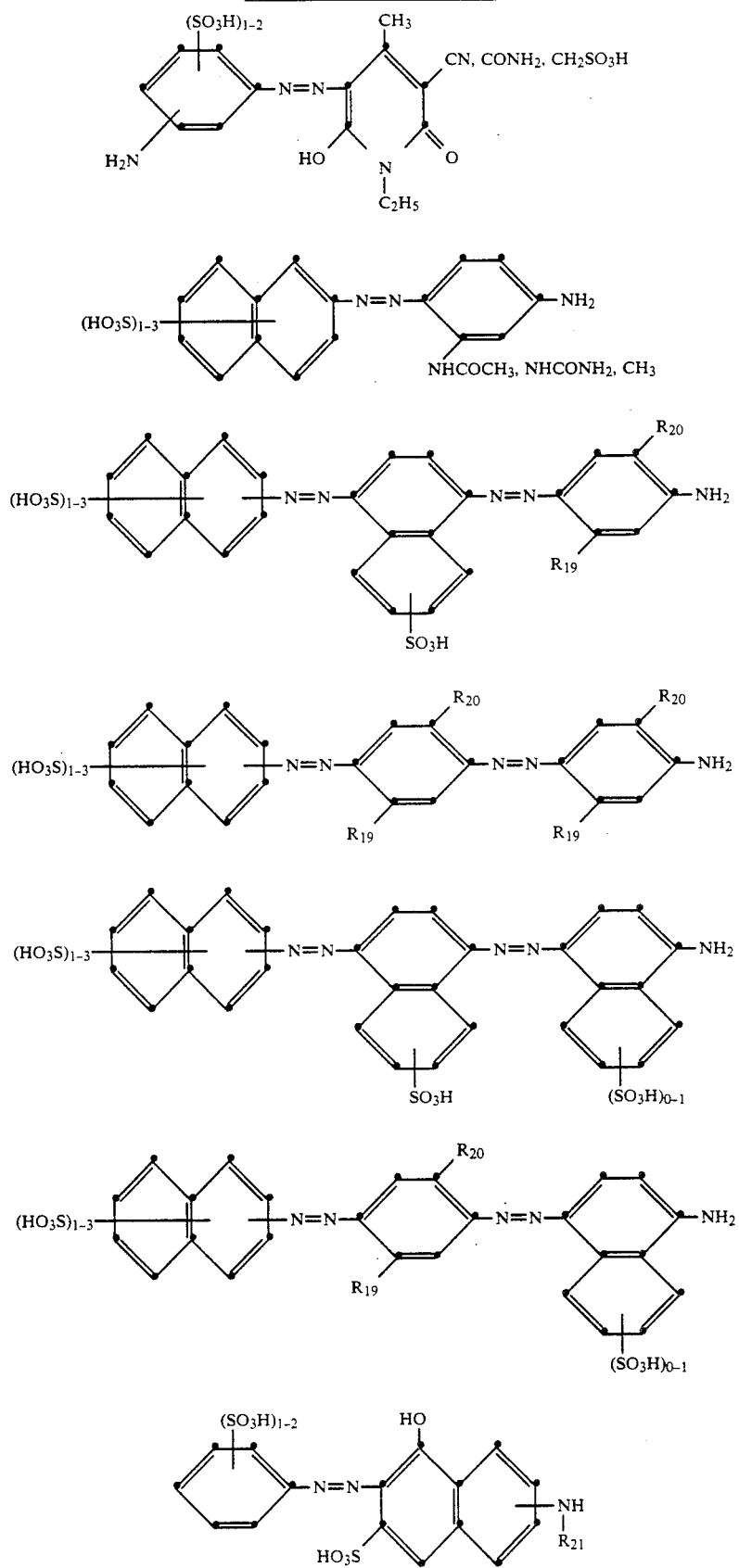

-continued
Organic dyes of the formula (24)
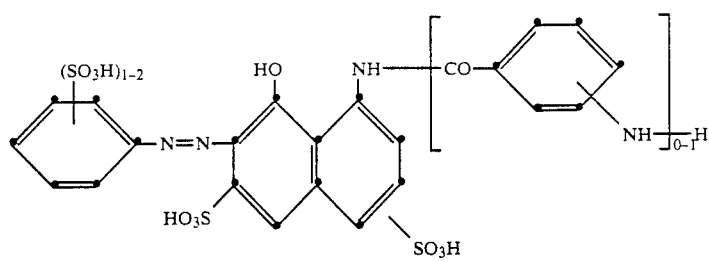
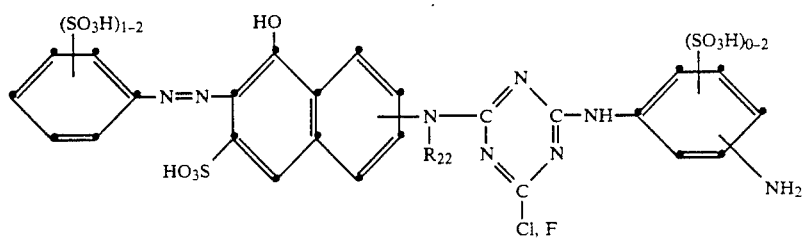
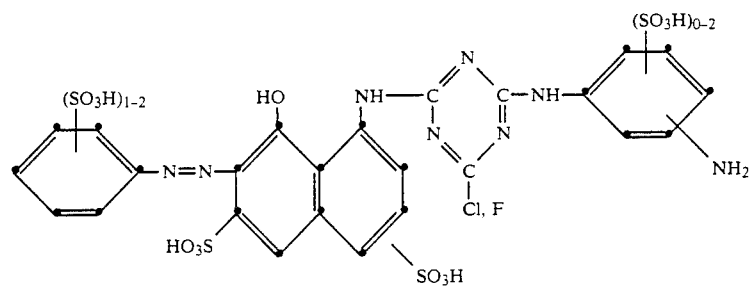
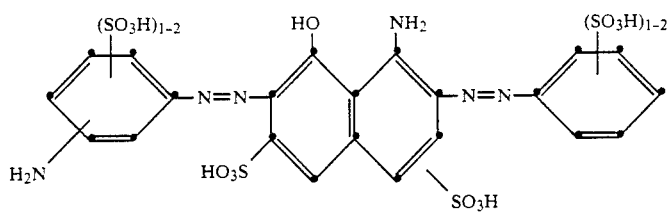
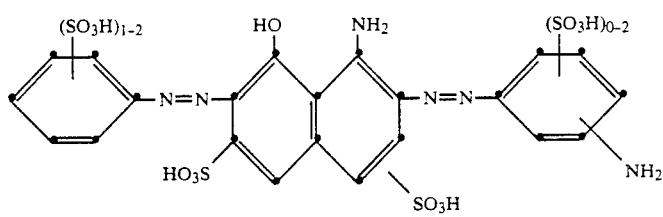
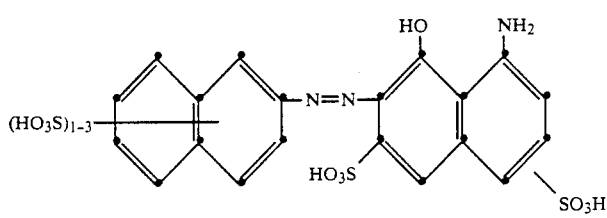
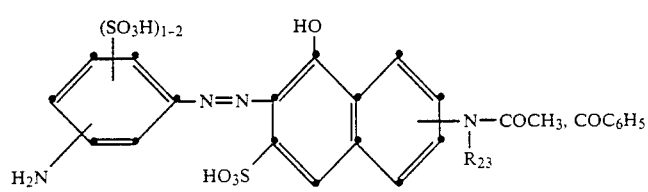

-continued

Organic dyes of the formula (24)

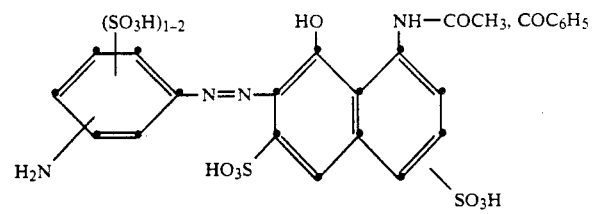

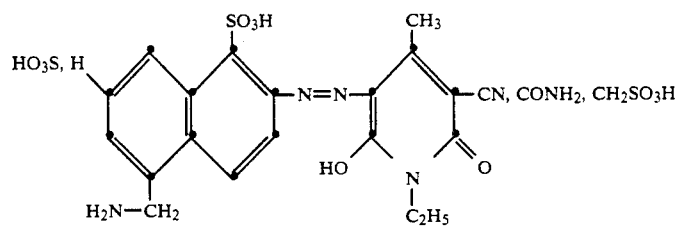

Metal complexes of dyes of the formulae:

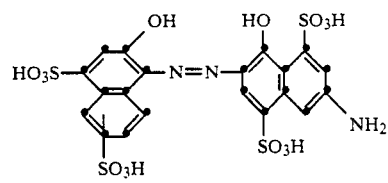

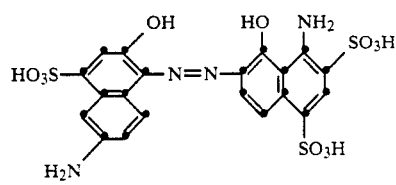

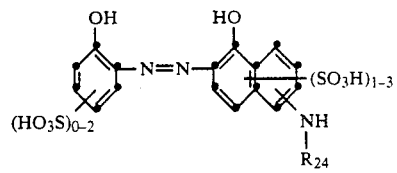

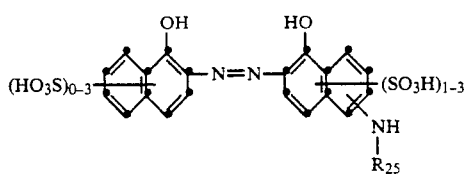

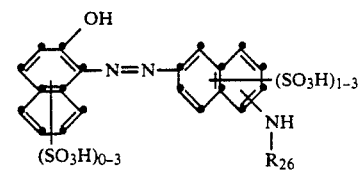

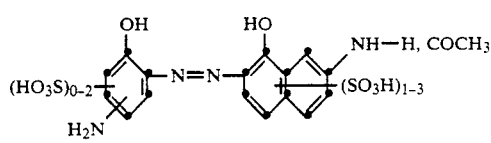

Preferred metal atoms are Cu (1:1 complex) or Cr and Co (1:2 complex). Cr and Co complexes may contain the azo compound of the abovementioned formula once or twice; that is, they may have a symmetrical structure or, by incorporating any other desired ligands, have an asymmetrical structure.

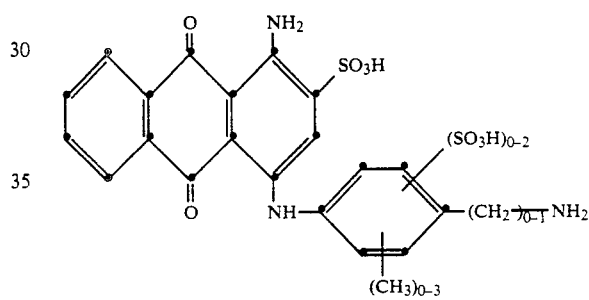

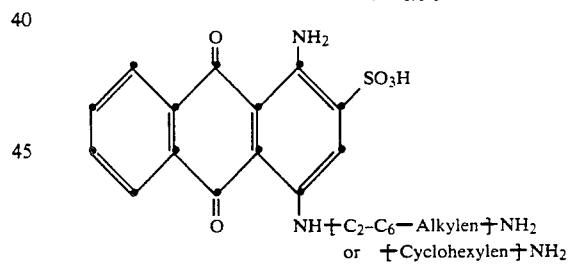

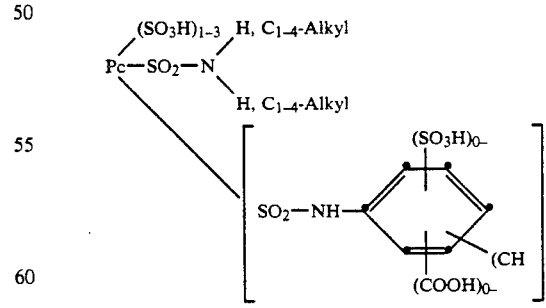

or together with $C_{4-5}$alkylene with or without interruption by N or O.

In this formula, Pc is the Cu- or Ni-phthalocyanine radical, the total number of substituents of the Pc skeleton being 4.

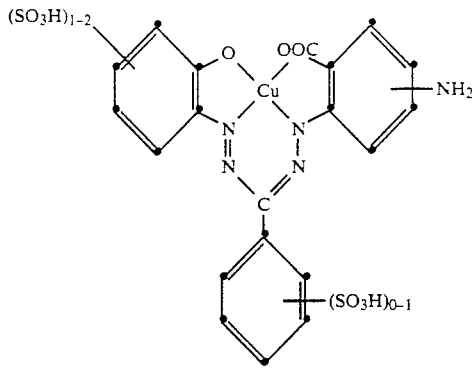
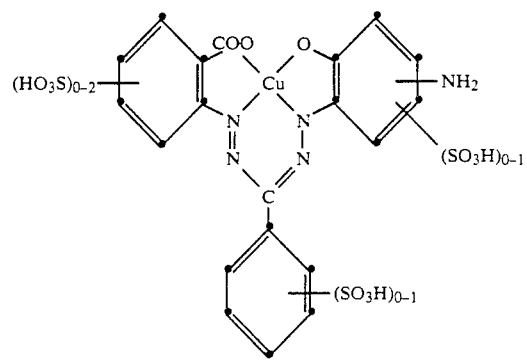
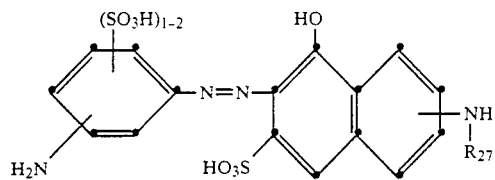
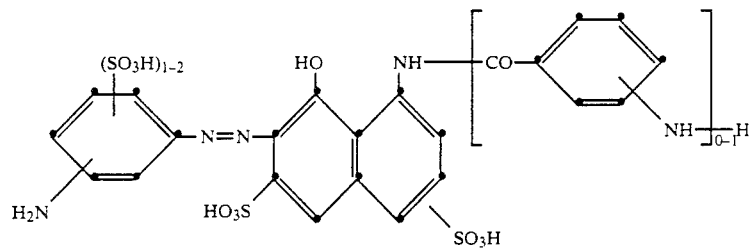
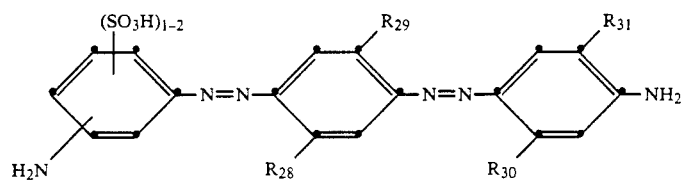
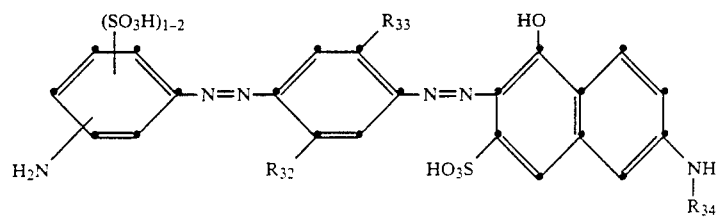

-continued
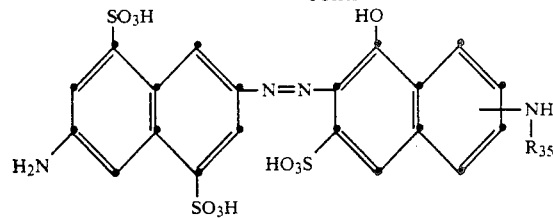
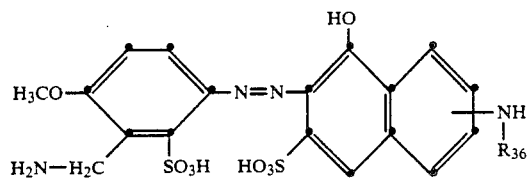
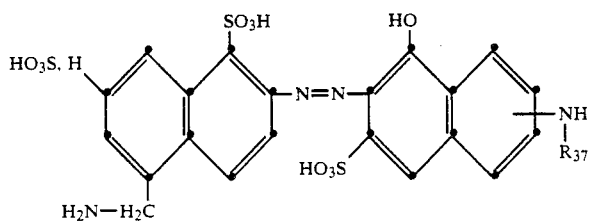
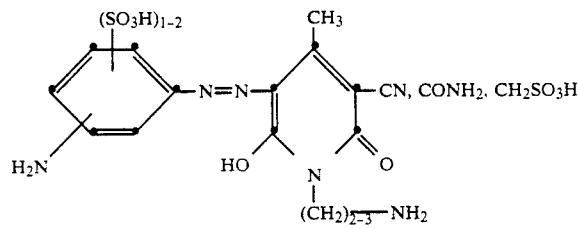
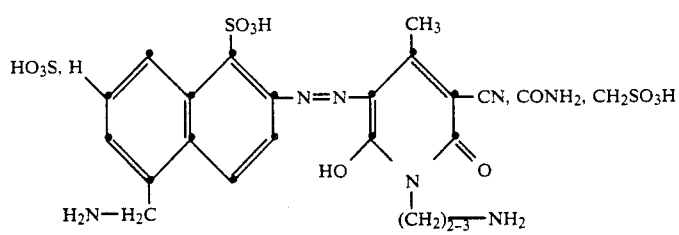
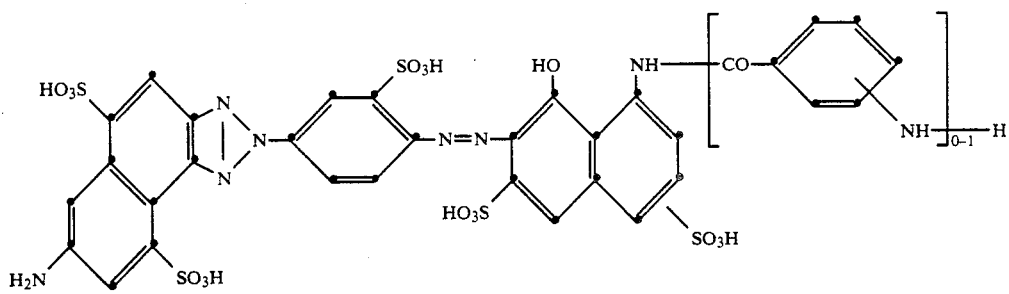
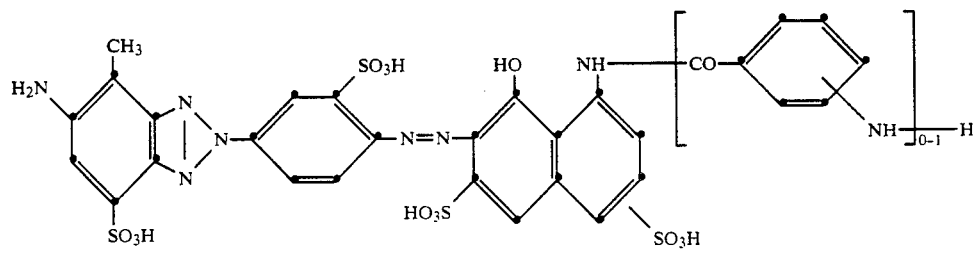

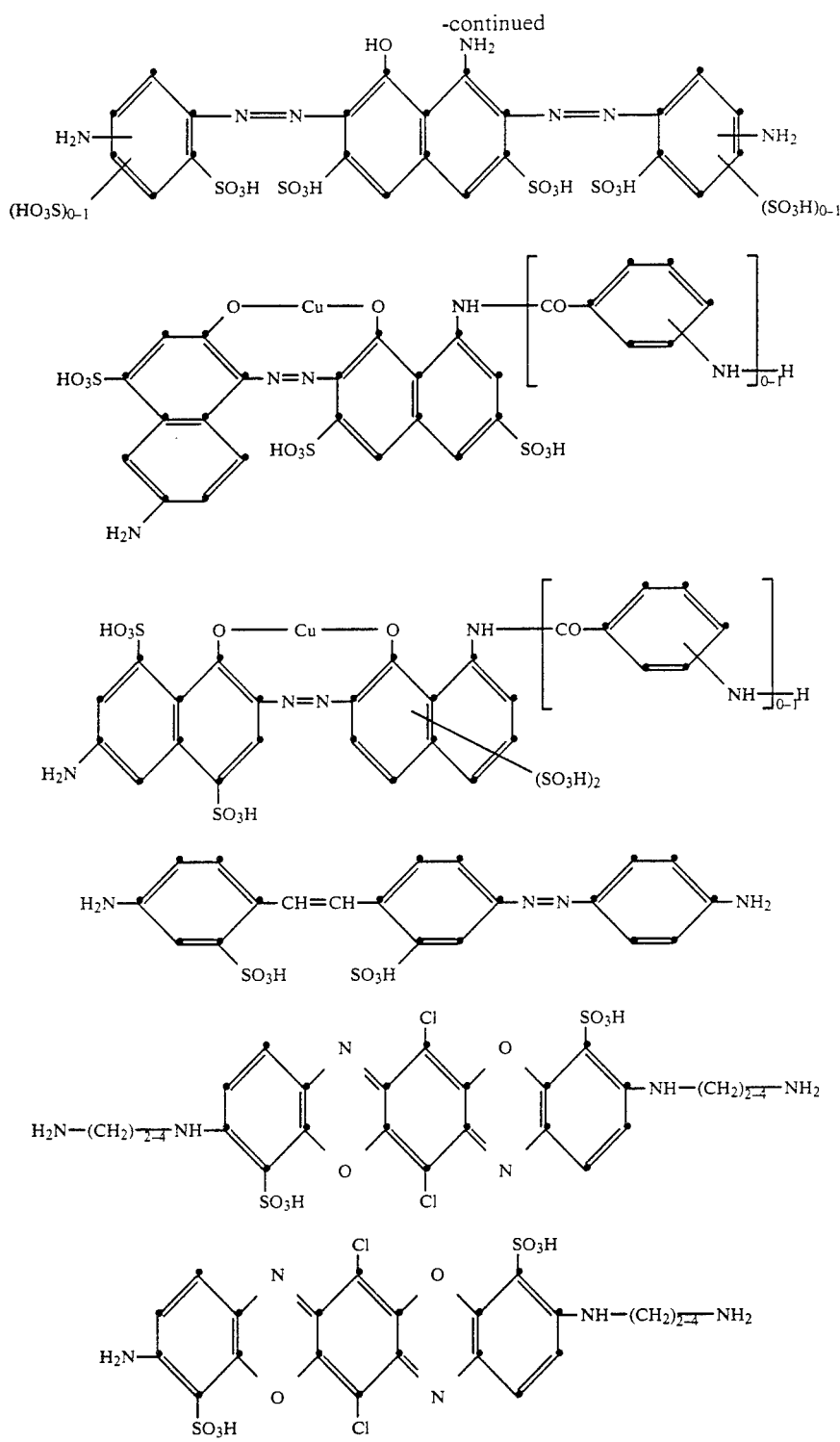

In the above-listed formulae, the radicals $R_{21}$ to $R_{27}$ and $R_{34}$ to $R_{37}$ are hydrogen or $C_1-C_4$alkyl, and the radicals $R_{19}$, $R_{20}$ and $R_{28}$ to $R_{33}$ are hydrogen, $C_1-C_4$alkyl, $C_1-C_4$alkoxy, $C_1-C_4$alkanoylamino, ureido or halogen, with the radicals $R_{19}$, $R_{20}$... etc., which belong to one and the same formula, being independent of one another. Preferably, the radicals $R_{21}$ to $R_{27}$ and $R_{34}$ to $R_{37}$ are hydrogen, methyl or ethyl and the radicals $R_{19}$, $R_{20}$ and $R_{28}$ to $R_{33}$ are hydrogen, methyl, ethyl, methoxy, ethoxy, acetylamino, ureido or chlorine. The aromatic rings in the above dyes may be further substituted, the benzene rings in particular by methyl, ethyl, methoxy, ethoxy, methylsulfonyl, ethylsulfonyl, carboxyl, acetylamino or chlorine and the naphthalene rings in particular by methoxy, carboxyl, acetylamino, nitro or chlorine; the same is true of the anthraquinones, dioxazines etc. Preferably, the benzene rings are not further substituted.

Specific diazo and coupling components are:
Diazo components:

Aminobenzene, 1-amino-2-, -3- or 4-methylbenzene, 1-amino-2-, -3- or -4-methoxybenzene, 1-amino-2-, -3- or 4-chlorobenzene, 1-amino-2,5-dichlorobenzene, 1-amino-2,5-dimethylbenzene, 1-amino-3-methyl-6-methoxybenzene, 1-amino-2-methoxy-4-nitrobenzene, 4-aminobiphenyl, 1-aminobenzene-2-, -3- or -4-carboxylic acid, 2-aminodiphenyl ether, 1-aminobenzene-2-, -3-, -4-sulfonamide, -N-methylamide, -N-ethylamide, -N,N-dimethylamide or N,N-diethylamide, dehydrothio-p-toluidinesulfonic acid, 1-amino-3-trifluoromethyl-6-sulfonic acid, 1-amino-3- or -4-nitrobenzene, 1-amino-3- or 4-acetylaminobenzene, 1-amino-benzene -2-, -3- or -4-sulfonic acid, 1-aminobenzene-2,4- and 2,5-disulfonic acid, 1-amino-4-methylbenzene-2-sulfonic acid, 1-amino-3-methylbenzene-6-sulfonic acid, 1-amino-6-methylbenzene-3- or -4-sulfonic acid, 1-amino-2-carboxybenzene-4-sulfonic acid, 1-amino-4-carboxybenzene-2-sulfonic acid, 1-amino-4- or -5-chlorobenzene-2-sulfonic acid, 1-amino-6-chlorobenzene-3- or -4-sulfonic acid, 1-amino-3,4-dichlorobenzene-6-sulfonic acid, 1-amino-2,5-dichlorobenzene-6-sulfonic acid, 1-amino-2,5-dichlorobenzene-4-sulfonic acid, 1-amino-4-methyl-5-chlorobenzene-2-sulfonic acid, 1-amino-5-methyl-4-chlorobenzene-2-sulfonic acid, 1-amino-4- or -5-methoxybenzene-2-sulfonic acid, 1-amino-6-methoxybenzene-3- or -4-sulfonic acid, 1-amino-6-ethoxybenzene-3- or -4-sulfonic acid, 1-amino-2,4-dimethoxybenzene-6-sulfonic acid, 1-amino-2,5-dimethoxybenzene-4-sulfonic acid, 1-amino-3-acetylaminobenzene-6-sulfonic acid, 1-amino-4-acetylaminobenzene-2-sulfonic acid, 1-amino-3-acetylamino-4-methylbenzene-6-sulfonic acid, 2-amino-1-methylbenzene-3,5-disulfonic acid, 1-amino-4-methoxybenzene-2,5-disulfonic acid, 1-amino-3- or -4-nitrobenzene-6-sulfonic acid, 1-aminonaphthalene, 2-aminonaphthalene, 1-aminonaphthalene-2-, -4-, -5-, -6-, -7- or -8-sulfonic acid, 2-aminonaphthalene-1-, -3-, -4-, -5-, -6-, -7- or -8-sulfonic acid, 1-aminonaphthalene-3,6- or -5,7-disulphonic acid, 2-aminonaphthalene-1,56-, -1,7-, -3,6-, -5,7-, -4,8- or -6,8-disulfonic acid, 1-aminonaphthalene-2,5,7-trisulfonic acid, 2-aminonaphthalene-1,5,7-, -3,6,8- or -4,6,8-trisulfonic acid, 1-hydroxy-2-aminobenzene-4-sulfonic acid, 1-hydroxy-2-aminobenzene-5-sulfonic acid, 1-hydroxy-2-aminobenzene-4,6-disulfonic acid, 1-hydroxy-2-amino-4-acetylaminobenzene-6-sulfonic acid, 1-hydroxy-2-amino-6-acetylaminobenzene-4-sulfonic acid, 1-hydroxy-2-amino-4-chlorobenzene-5-sulfonic acid, 1-hydroxy-2-amino-4-methylsulfonylbenzene, 1-amino-2-hydroxy-6-nitronaphthalene-4-sulfonic acid, 2-amino-1-hydroxynaphthalene-4,8-disulfonic acid, 4-aminoazobenzene-3,4'-disulfonic acid, 3-methoxy-4-amino-6-methylazobenzene-2',4'-disulfonic acid, 3-methoxy-4-amino-6-methylazobenzene-2',5'-disulfonic acid, 1,3-diaminobenzene, 1,4-diaminobenzene, 1,3-diamino-4-chlorobenzene, 1,3-diamino-4-methylbenzene, 1,3-diamino-4-ethylbenzene, 1,3-diamino-4-methoxybenzene, 1,3-diamino-4-ethoxybenzene, 1,4-diamino-2-methylbenzene, 1,4-diamino-2-methoxybenzene, 1,4-diamino-2-ethoxybenzene, 1,4-diamino-2-chlorobenzene, 1,4-diamino-2,5-dimethylbenzene, 1,4-diamino-2,5-diethylbenzene, 1,4-diamino-2-methyl-5-methoxybenzene, 1,4-diamino-2,5-dimethoxybenzene, 1,4-diamino-2,5-diethoxybenzene, 2,6-diaminonaphthalene, 1,3-diamino-2,4,6-trimethylbenzene, 1,4-diamino-2,3,5,6-tetramethylbenzene, 1,3-diamino-4-nitrobenzene, 4,4'-diaminostilbene, 4,4'-diaminodiphenylmethane, 4,4'-diaminobiphenyl (Benzidene), 3,3'-dimethylbenzidene, 3,3'-dimethoxybenzidene, 3,3'-dichlorobenzidene, 3,3'-dicarboxybenzidene, 3,3'-dicarboxymethoxybenzidene, 2,2'-dimethylbenzidene, 4,2'-diaminodiphenyl (Diphenylene), 2,6-diaminonaphthalene-4,8-disulfonic acid, 1,4-diaminobenzene-2-sulfonic acid, 1,4-diaminobenzene-2,5-disulfonic acid, 1,4-diaminobenzene-2,6-disulfonic acid, 1,3-diaminobenzene-4-sulfonic acid, 1,3-diaminobenzene-4,6-disulfonic acid, 1,4-diamino-2-chlorobenzene-5-sulfonic acid, 1,4-diamino-2-methylbenzene-5-sulfonic acid, 1,5-diamino-6-methylbenzene-3-sulfonic acid, 1,3-diamino-6-methylbenzene-4-sulfonic acid, 3-(3'- or 4'-aminobenzoylamino)-1-aminobenzene-6-sulfonic acid, 1-(4'-aminobenzoylamino)-4-aminobenzene-2,5-disulfonic acid, 1,4-diaminobenzene-2-carboxylic acid, 1,3-diaminobenzene-4-carboxylic acid, 1,2-diaminobenzene-4-carboxylic acid, 1,3-diaminobenzene-5-carboxylic acid, 1,4-diamino-2-methylbenzene, 4,4'-diaminodiphenyloxide, 4,4'-diaminodiphenylurea-2,2'-disulfonic acid, 4,4'-diaminodiphenyloxyethane-2,2'-disulfonic acid, 4,4'-diaminostilbene-2,2'-disulfonic acid, 4,4'-diaminodiphenylethane-2,2'-disulfonic acid, 2-amino-5-aminomethylnaphthalene-1-sulfonic acid, 2-amino-5-aminomethylnaphthalene-1,7-disulfonic acid, 1-amino-4-methoxy-5-aminomethylbenzene-6-sulfonic acid.

If the diazo component to be used is not a diamine but an aminoacetylamino compound from which the acetyl group is subsequently eliminated again by hydrolysis, as is mentioned above in the explanations of the process variants, possibilities are the monoacetyl compounds of the abovementioned diazo components, for example 1-acetylamino-3-aminobenzene-4-sulfonic acid or 1-acetylamino-4-aminobenzene-3-sulfonic acid.

Coupling components:

Phenol, 1-hydroxy-3-' or -4-methylbenzene, 1-hydroxybenzene-4-sulfonic acid, 1-hydroxynaphthalene, 2-hydroxynaphthalene, 2-hydroxynaphthalene-6- or -7-sulfonic acid, 2-hydroxynaphthalene-3,6- or -6,8-disulfonic acid, 1-hydroxynaphthalene-4-sulfonic acid, 1-hydroxynaphthalene-4,6- or -4,7-disulfonic acid, 1-amino-3-methylbenzene, 1-amino-2-methoxy-5-methylbenzene, 1-amino-2,5-dimethylbenzene, 3-aminophenylurea, 1-amino-3-acetylaminobenzene, 1-amino-3-hydroxyacetylaminobenzene, 1,3-diaminobenzene-4-sulfonic acid, 1-aminonaphthalene-6- or -8-sulfonic acid, 1-amino-2-methoxynaphthalene-6-sulfonic acid, 2-aminonaphthalene-5,7-disulfonic acid, 1-amino-8-hydroxynaphthalene-4-sulfonic acid, 1-amino-8-hydroxynaphthalene-6-sulfonic acid, 1-amino-8-hydroxynaphthalene-2,4-disulfonic acid, 2-hydroxy-3-aminonaphthalene-5,7-disulfonic acid, 1-amino-8-hydroxynaphthalene-2,4,6-trisulfonic acid, 1-hydroxy-8-acetyl-aminonaphthalene-3-sulfonic acid, 1-benzoylamino-8-hydroxynaphthalene-3,6- or -4,6-disulfonic acid, 2-benzoylamino-5-hydroxynaphthalene-7-sulfonic acid, 2-amino-5-hydroxynaphthalene-7-sulfonic acid, 2-methyl- or 2-ethyl-amino-5-hydroxynaphthalene-7-sulfonic acid, 2-(N-acetyl-N-methylamino)-5-hydroxynaphthalene-7-sulfonic acid, 2-acetylamino-5-hydroxynaphthalene-7-sulfonic acid, 2-amino-5-hydroxynaphthalene-1,7-disulfonic acid, 2-amino-8-hydroxynaphthalene-6-sulfonic acid, 2-methyl- or -ethylamino-8-hydroxynaphthalene-6-sulfonic acid, 2-(N-acetyl-N-methylamino)-8-hydroxynaphthalene-6-sulfonic acid, 2-acetylamino-8-hydroxynaphthalene-6-sulfonic acid, 2-amino-8-hydroxynaphthalene-3,6-disulfonic acid, 2-acetylamino-8-hydroxynaphthalene-3,6-disulfonic acid, 1-amino-5-hydroxynaphthalene-7-sulfonic acid, 1-amino-8-hydroxynaphthalene-3,6- or -4,6- disulfonic acid, 1-acetylamino-8-hydroxynaphthalene-3,6- or -4,6-disulfonic acid, 1-(4'-aminobenzoylamino)-8-hydroxynaphthalene-3,6- or -4,6-disulfonic acid, 1-(4'-nitrobenzoylamino)-8-hydroxynaphthalene-3,6- or -4,6-disulfonic acid, 1-(3'-aminobenzoylamino)-8-hydroxynaphthalene-3,6- or -4,6-disulfonic acid, 1-(3'-nitrobenzoylamino)-8-hydroxynaphthalene-3,6- or -4,6-disulfonic acid, 2-(4'-amino-3'-sulfophenylamino)-5-hydroxynaphthalene-7-sulfonic acid, 3-methyl-5-pyrazolone, 1-phenyl-3-methyl-5-pyrazolone, 1-(4'-sulfophenyl)-3-methyl-5-pyrazolone, 1-(4'-sulfophenyl)-5-pyrazolone-3-carboxylic acid, 1-(3'-aminophenyl)-3-methyl-5-pyrazolone, 1-(2',5'-disulfophenyl)-3-methyl-5-pyrazolone, 1-(2'-methyl-4'-sulfophenyl)-5-pyrazolone-3-carboxylic acid, 1-(4',8'-disulfo-2'-naphthyl)-3-methyl-5-pyrazolone, 1-(5',7'-sulfo-2'-naphthyl)-3-methyl-5-pyrazolone, 1-(2',5'-dichloro-4'-sulfophenyl)-3-methyl-5-pyrazolone, 3-aminocarbonyl-4-methyl-6-hydroxy-2-pyridone, 1-ethyl-3-cyano- or -3-chloro-4-methyl-6-hydroxy-2-pyridone, 1-ethyl-3-sulfonmethyl-4-methyl-6-hydroxy-2-pyridone, 2,4,6-triamino-3-cyanopyridine, 2-(3'-sulfophenylamino)-4,6-diamino-3-cyanopyridine, 2-(2'-hydroxyethylamino)-3-cyano-4-methyl-6-aminopyridine, 2,6-bis-(2'-hydroxyethylamino)-3-cyano-4-methylpyridine, 1-ethyl-3-carbamoyl-4-methyl-6-hydroxy-2-pyridone, 1-ethyl-3-sulfomethyl-4-methyl-5-carbamoyl-6-hydroxy-2-pyridone, N-acetoacetylaminobenzene, 1-(N-acetoacetylamino)-2-methoxybenzene-5-sulphonic acid, 4-hydroxy-2-quinolone, 1-amino-8-hydroxy-2-(phenylazo)-naphthalene-3,6-disulfonic acid, 1-amino-8-hydroxy-2-(4'-sulfophenylazo)-naphthalene-3,6-disulfonic acid, 1-amino-8-hydroxy-2-(2',5'-disulfophenylazo)-naphthalene-3,6-disulfonic acid, 1-β-aminoethyl-3-cyano-4-methyl-6-hydroxy-2-pyridone, 1-γ-aminopropyl-3-sulfomethyl-4-methyl-6-hydroxy-2-pyridone, 1,3-diaminobenzene, 1-amino-3-N,N-di-β-hydroxyethylaminobenzene, 1-amino-3-N,N-di-β-sulfatoethylaminobenzene, 1-amino-3-N,N-di-β-hydroxyethylamino-4-methoxybenzene, 1-amino-3-N,N-di-β-sulfatoethylamino-4-methoxybenzene, 1-amino-3-sulfo-benzylaminobenzene, 1-amino-3-sulfo-benzylamino-4-chlorobenzene, 1-amino-3-N,N-disulfobenzylaminobenzene.

Triazines 2,4,6-Trifluoro-s-triazine (cyanuric fluoride), 2,4,6-trichloro-s-triazine (cyanauric chloride), 2,4,6-tribromo-s-triazine (cyanauric bromide).

Amines of the formula (26)

They can be prepared by condensing corresponding nitrobenzoyl, nitrophenylalkanoyl or nitrophenoxyalkanoyl chlorides with amines of the formula

H—R  (35)

which correspnd to the radicals of the formulae (2a) to (2f) and reducing the nitro group to an amino group.

Examples of amines of the formula (26) are the following compounds:

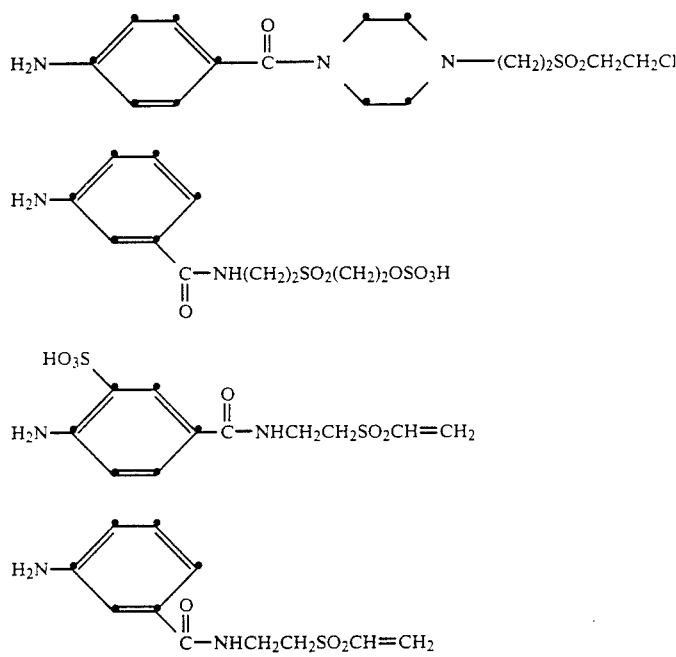

The reaction is preferably carried out in a higher than boiling organic solvent, for example nitrobenzene. The reduction of the nitro group to an amino group is effected in a manner known per se by catalytic hydrogenation with Pd/carbon in ethanol, ethyl acetate or tetrahydrofuran at room temperature to about 40° C. The reduction can also be carried out with Fe/hydrochloric acid or Fe/acetic acid in aqueous solution.

According to another method described in the literature, the acid chloride can be reacted with an unsaturated aliphatic amine, and 2-mercaptoethanol be added onto the double bond of the acid amide with the aid of catalytic amounts of a free radical former or sulfur at temperatures between 50° C. and 180° C. The hydroxyethyl thioether compounds obtained as a result can also be prepared by condensing the acid chloride with a haloalkylamine and heating the condensation product in alcohol with 2-mercaptoethanol and sodium alcoholate. The thioether compounds are then oxidized to the corresponding sulfones.

The oxidation of the thioether compounds to sulfones can be carried out by various methods, for example with hydrogen peroxide with or without tungsten or vanadium compounds as catalysts, and also with peracetic acid, potassium permanganate or chromic acid, or with chlorine/hydrochloric acid, in each case in an aqueous, aqueous-organic or organic medium.

The carboxamides thus obtainable, where the grouping $-SO_2-Z$ is a $\beta$-hydroxyethylsulfonyl group, can be converted, by treatment with sulfating agents, phosphorylating agents, halogenating agents, alkylsulfonic or arylsulfonic acid halides, alkylcarboxylic or arylcarboxylic acid halides or alkylcarboxylic or arylcarboxylic anhydrides, into the corresponding dye precursors where the grouping $-SO_2-Z$ is for an example an $-SO_2-CH_2-CH_2-O-SO_3H$, $-SO_2-CH_2-CH_2-O-PO_3H_2-$, $-SO_2-CH_2-CH_2-$ halogen, $-SO_2-CH_2-CH_2-O-CO-CH_3$ or $-SO_2-CH_2-CH_2-O-CO-C_6H_5$ grouping. The products thus obtained can in turn be converted by treatment with alkaline agents, for example alkali metal hydroxide or alkali metal carbonate, such as sodium hydroxide or sodium carbonate, into corresponding compounds where the grouping $-SO_2-Z$ is a $-SO_2-CH=CH_2$ grouping. The products thus obtained can again be converted by reaction (addition) with salts of thiosulfuric acid, such as sodium thiosulfate, into compounds in which the grouping $-SO_2-Z$ is an $-SO_2-CH_2-CH_2-S-SO_3H$ grouping.

Suitable sulfating agents are here for example concentrated sulfuric acid and also chlorosulfuric acid and amidosulfuric acid or other sulfur trioxide donor compounds. Suitable phosphorylating agents are here for example concentrated phosphoric acid, pyrophosphoric acid, metaphosphoric acid, polyphosphoric acid, alkyl polyphosphates, phosphorus oxychloride or mixtures of phosphoric acid and phosphorus(V) oxide. Suitable halogenatng agents are for example thionyl chloride and thionyl bromide.

c) Amines of the formula (27)

1-Amino-2-, -3- or -4-phenyl $\beta$-sulfatoethyl sulfone, 1-amino-3-phenyl $\beta$-phosphatoethyl sulfone, 1-amino-4-methyl-3-phenyl $\beta$-sulfatoethyl sulfone, 1-amino-3-phenyl $\beta$-chloroethyl sulfone, 1-amino-4-methoxy-3-phenyl $\beta$-sulfatoethyl sulfone, 1-amino-2-sulfo-4-phenyl $\beta$-sulfatoethyl sulfone, 1-amino-2-sulfo-5-phenyl $\beta$-sulfatoethyl sulfone, 1-amino-2,4-disulfo-5-phenyl $\beta$-sulfatoethyl sulfone, 1-amino-4-naphthyl $\beta$-sulfatoethyl sulfone, 1-amino-2,5-dimethoxy-4-phenyl $\beta$-sulfatoethyl sulfone, 1-amino-2-carboxy-4-phenyl $\beta$-sulfatoethyl sulfone, 1-amino-2-carboxy-5-phenyl $\beta$-sulfatoethyl sulfone, 1-amino-2-methoxy-4-phenyl $\beta$-sulfatoethyl sulfone, 1-amino-2-chloro-4-phenyl $\beta$-sulfatoethyl sulfone, 1-amino-2-methoxy-5-phenyl $\beta$-sulfatoethyl sulfone, 2-amino-8-naphthyl $\beta$-sulfatoethyl sulfone, 2-amino-6-sulfo-8-naphthyl $\beta$-sulfatoethyl sulfone, 1-amino-2,5-dimethoxy-4-phenyl vinyl sulfone, 1-amino-2-methoxy-5-methyl-4-phenyl $\beta$-sulfatoethyl sulfone, 1-amino-2,5-diethoxy-4-phenyl $\beta$-sulfatoethyl sulfone, 1-amino-2-bromo-4-phenyl $\beta$-sulfatoethyl sulfone, 1-amino-2-bromo-4-phenyl vinyl sulfone, 1-amino-2,4-disulfo-5-phenyl vinyl sulfone, 1-amino-2,4-disulfo-5-phenyl $\beta$-phosphatoethyl sulfone, 1-amino-2,4-disulfo-5-phenyl $\beta$-chloroethyl sulfone, 2-amino-6-sulfo-8-naphthyl $\beta$-phosphatoethyl sulfone, 2-amino-6-sulfo-8-naphthyl vinyl sulfone, 1-amino-2-methoxy-5-methyl-4-phenyl $\beta$-chloroethyl sulfone, 2-amino-1-hydroxy-4-phenyl $\beta$-sulphatoethyl sulfone, 1-amino-3- or -4-phenyl vinyl sulfone, 1-amino-2-hydroxy-4-phenyl $\beta$-sulfatoethyl sulfone, 1-amino-2-sulfo-5-phenyl vinyl sulfone, 3-(N-methyl-$\beta$-sulfatoethylsulfonamino)-1-aminobenzene, 3-(N-ethyl-$\beta$-sulfatoethylsulfonamino)-1-aminobenzene, 3-$\beta$-sulfatoethylsulfonamino-1-aminobenzene.

Amines of the formula (28)

$\beta(\beta'$-Sulfatoethylsulfonyl)ethylamine, $\beta$-vinylsulfonylethoxyethylamine, $\beta$-vinylsulfonylethylamine, $\beta(\beta'$-sulfatoethylsulfonyl)ethoxyethylamine.

The compounds of the formulae (24) to (28) are known per se and can be prepared analogously to known methods.

The condensation of the s-triazine of the formula (25) with the organic dyes of the formula (24) or with the diazothiazable and/or couplable components containing an $-N(R_1)H$ group is preferably effected in aqueous solution or suspension, at low temperatures, preferably between 0° and 5° C. and at a weakly acidic, neutral to weakly alkaline pH. Advantageously, the hydrogen halide feed in the course of the condensation is continuously neutralized by adding aqueous alkali metal hydroxides, alkali metal carbonates or alkali metal bicarbonates. For further reaction of the halotriazine dyes thus formed, or for the reaction of the 2,4,6-trihalo-s-triazine, with the compounds of the formulae (26) or (27) or (28), free amines or salts thereof, preferably in the form of the hydrochloride, are used. The reaction is carried out at temperatures between about 0° and 40° C., preferably between 5° and 25° C., in the presence of acid-binding agents, preferably sodium carbonate, within a pH range from 2 to 8, preferably 5 to 6.5.

The condensation of the halotriazine with a compound of the formula (26), (27) or (28) can be carried out before or after condensation of the halotriazine with a dye of the formula (24). The condensation of the halotriazine with a compound of the formula (26) or (27) or (28) is preferably carried out in aqueous solution or suspension, at low temperature and at a weakly acidic to neutral pH. Here too the hydrogen halide freed in the course of condensation is advantageously neutralized by the continuous addition of aqueous alkali metal hydroxides, alkali metal carbonates or alkali metal bicarbonates.

The diazotization of the diazo components, or of the intermediates containing a diazotizable amino group, is effected in general by the action of nitrous acid in aqueous mineral acid solution at low temperature. The coupling onto the coupling component takes place at strongly acid, neutral or weakly alkaline pH.

The reactive dyes of the formula (1) are suitable for dyeing and printing a very wide range of materials, such as silk, leather, wool, polyamide fibres and polyurethanes, and in particular cellulose-containing fibre materials of any kind. Such fibre materials are for example the neutral cellulose fibres, such as cottom, linen and hemp, and also cellulose pulp and regenerated cellulose. The reactive dyes of the formula (1) are also suitable for dyeing or printing hydroxyl-containing fibres which are present in blend fabrics, for example mixtures of cotton with polyester fibres or polyamide fibres.

The dyes according to the invention can be applied to the fibre material and fixed on the fibre in various ways, in particular in the form of aqueous dye solutions and print pastes. They are suitable not only for the exhaust method of dyeing but also for dyeing by the padding method, whereby the material is impregnated with aqueous, optionally salt-containing dye solutions and the dyes are fixed after an alkali treatment or in the presence of alkali, if desired by heating. They are likewise suitable for the cold pad-latch process, whereby the dye is applied together with the alkali on a pad-mangle and is then fixed by storing for several hours at room temperature. After fixing, the dyeings and prints are thoroughly rinsed with cold and hot water, in the presence or absence of an agent which has a dispersing action and promotes the diffusion of the unfixed portions.

If the reactive dyes of the formula (1) in which D is the radical of an anthraquinone dye are insufficiently soluble in the alkaline dyeing liquor, this defect can be remedied in a manner known from the literature, namely by adding dispersants or other non-coloured compounds, for example a naphthalenesulfonic acid/-formaldehyde condensate or in particular anthraquinone-2-sulfonic acid.

The reactive dyes of the formula (1) are distinguished by high reactivity and good fixing properties and very good build-up. They can therefore be used for exhaustive dyeing at low dyeing temperatures and require only short steaming times in the pad-steam process. The degrees of fixation are high, and the unfixed portions can easily be washed off, the difference between the degree of exhaustion and the degree of fixation being remarkably small, i.e. the soaping loss being very small. The reactive dyes of the formula (1) are also suitable for printing, in particular on cotton, but also for printing nitrogen-containing fibres, for example wool, silk or wool- or silk-containing blend fabrics.

The dyeings and prints prepared with the dyes according to the invention on cellulose fibre materials have a high tinctorial strength and high fibre-dye bond stability, not only in the acid but also in the alkaline range, and also a good light fastness and very good wet fastness properties, such as wash, water, seawater, cross-dyeing and perspiration fastness properties, and also a good pleating fastness, hot press fastness and rub fastness.

The examples which follow serve to illustrate the invention. The temperatures are given in degrees celsius, and parts and percentages are by weight, unless otherwise stated. Parts by weight relate to parts by volume as the kilogram relates to the liter.

The preparation of the monoazo or disazo intermediate compounds has not been described in all cases in the working examples below, but it will be readily apparent from the general description.

EXAMPLE 1

A solution of 48.3 parts of 1-(4'-sulfophenyl)-3-carboxy-4-(4'-amino-2'-sulfophenylazo)-5-pyrazolone in 750 parts of ice-water is reacted at 0° to 2° C. and pH 5 with 14 parts of cyanauric fluoride. As soon as free amino groups are no longer detectable, 30 parts of 4-amino-N'-$\beta$-($\beta$'-chloroethylsulfonyl)ethylbenzamide hydrochloride are added and reacted at 0° to 20° C. and pH 5 to 7. Thereafter 30 parts of 3-amino-N'-$\beta$-($\beta$'-chloroethylsulfonyl)ethylbenzamide hydrochloride are added and reacted at 40° to 50° C. and a pH between 5 and 6. The dye obtained following precipitation with potassium chloride and gentle drying dyes cotton in fast golden yellow shades. In the form of the free acid it conforms to the formula

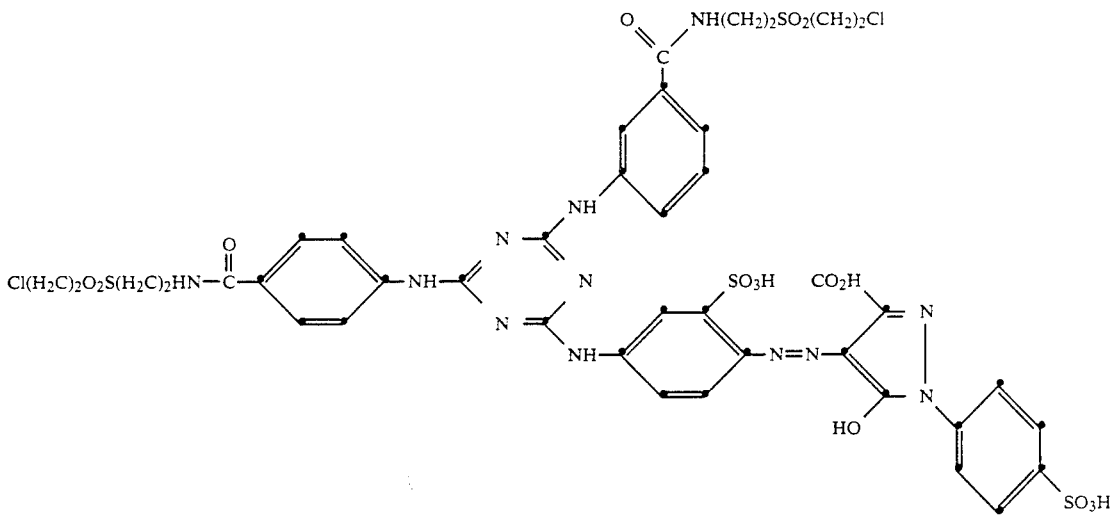

EXAMPLE 2

100 parts of the dye of Example 1 are dissolved in 1000 parts of water at room temperature under neutral conditions. A vinylation is then carried out at pH 10.0 for 30 minutes. The pH is then adjusted to 7.0, and the dye is isolated by spray-drying. In the form of the free acid is conforms to the formula

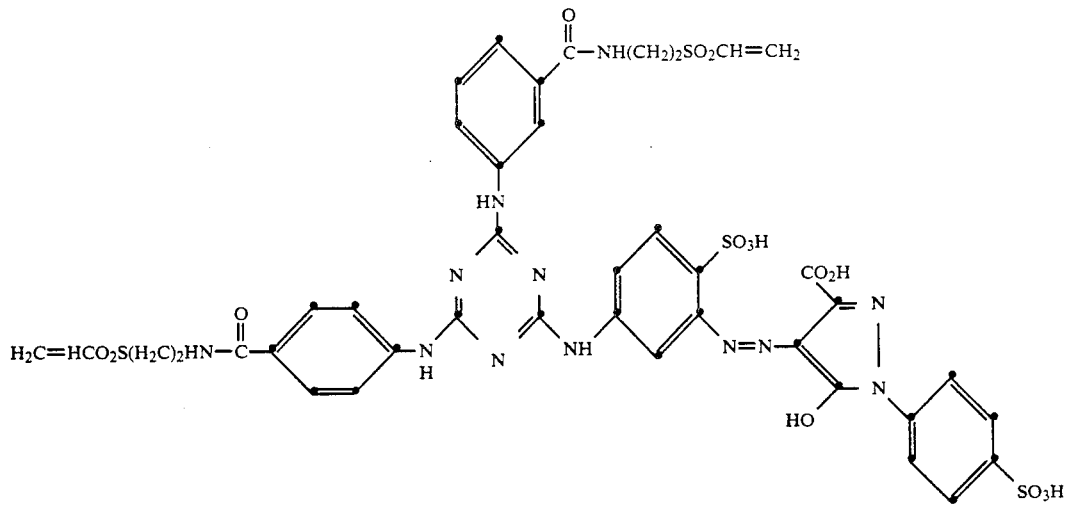

EXAMPLE 3

The condensation product of 18.8 parts of 1,3-phenylenediamine-4-sulfonic acid and 19 parts of cyanuric chloride is diazotized in hydrochloric acid solution, 28.5 parts of 1-(4'-sulfophenyl)-3-carboxy-5-pyrazolone are added, and coupling is carried out at a pH between 5 and 7. After addition of a solution of 65 parts of 3-amino-N'-β-(β'-chloroethylsulfonyl)ethylbenzamide, the temperature is raised to 20°-60° C. and the pH is adjusted to between 7.5 and 3.0. After the condensation has ended, the dye is precipitated from a neutral solution with potassium chloride and gently dried. It dyes cotton in fast yellow shades and conforms in the form of the free acid to the formula

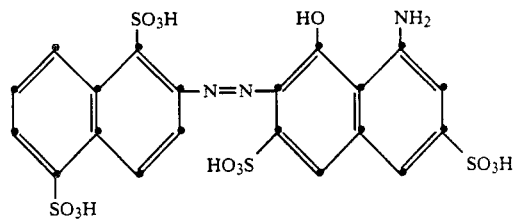

is added at 0° C. Thereafter 50 parts of 2N sodium carbonate solution are added dropwise, and a pH 6 to 6.5 is obtained. This is followed by the addition of 22 parts of HCl H$_2$NCH$_2$CH$_2$—O—CH$_2$CH$_2$SO$_2$CH=CH$_2$ as a powder. The temperature is raised to 40° C. in the

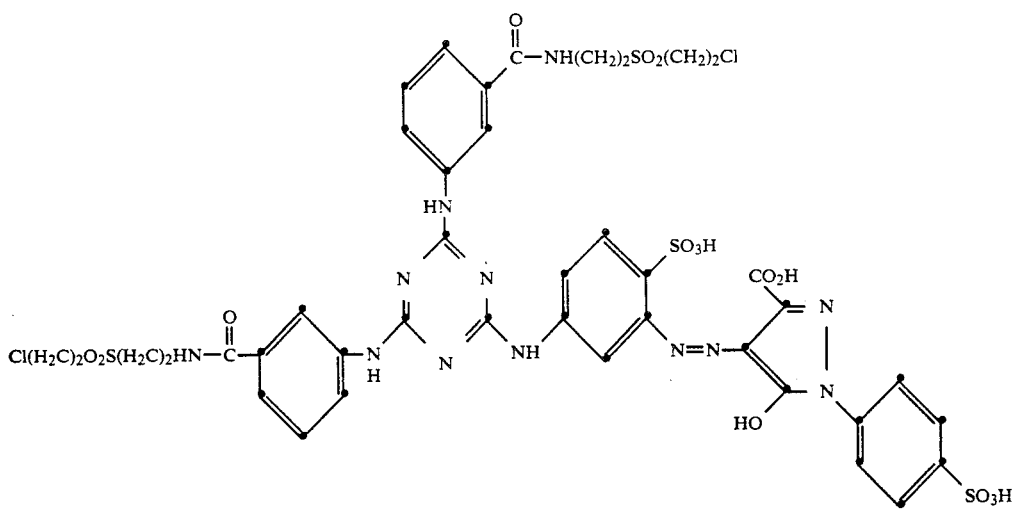

EXAMPLE 4

18.5 parts of cyanuric chloride are dissolved in 110 parts of acetone, and this solution is added with vigorous stirring to 250 parts of ice. A solution of 55.3 parts of the dye of the following structure:

course of half an hour and is maintained at that level for 3 hours. At the same time 100 parts of 2N sodium carbonate solution are added dropwise at a pH of 6.0 to 6.5. This is followed by 34 parts of 3-amino-N'-β-(β'-chloroethylsulfonyl)ethylbenzamide hydrochloride and a condensation reaction at 40° to 70° C. and a pH decreasing from 7.0 to 3.0 for 3 hours. The mixture is then cooled down to room temperature and vinylated at pH 10.0 for 30 minutes. The pH is adjusted to 5.5, and the dye is precipitated with 20% of potassium chloride. The reactive dye prepared conforms in the form of the free acid to the formula
the directions given in the preceding examples are the reactive dyes of the following formulae, which dye cotton in the hue indicated at column 3.
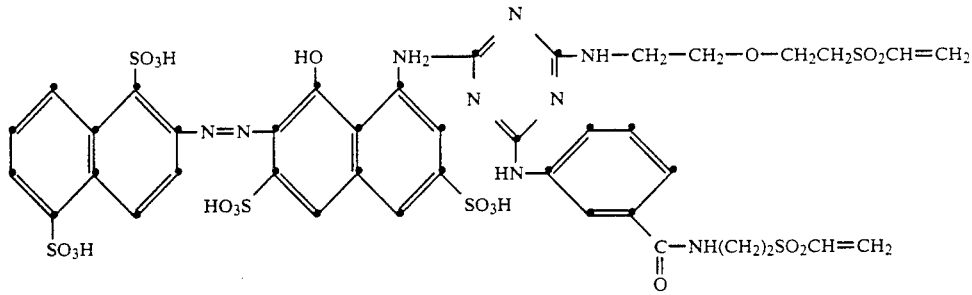
It dyes cotton in fast red shades.
Further dyes which may be prepared by following

| Example | Reactive dye | Hue on cotton |
|---|---|---|
| 5 | 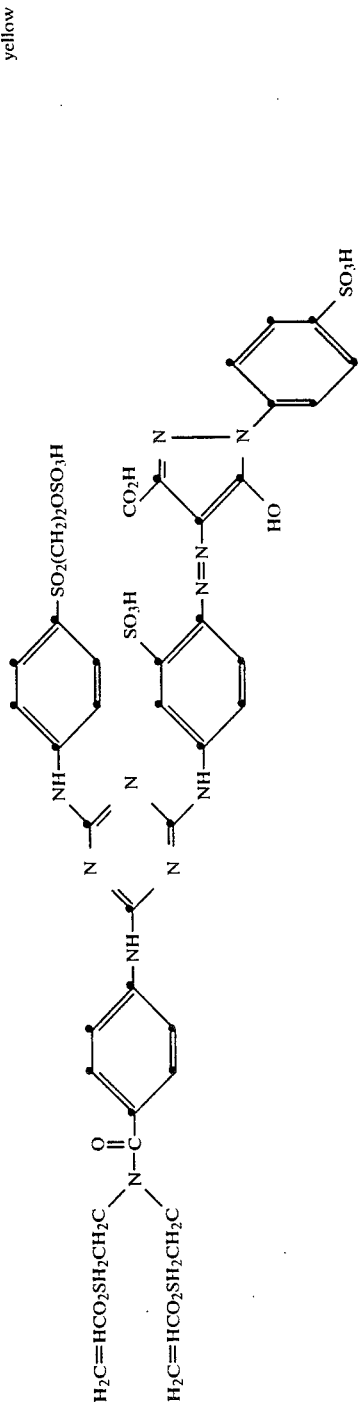 | yellow |
| 6 | 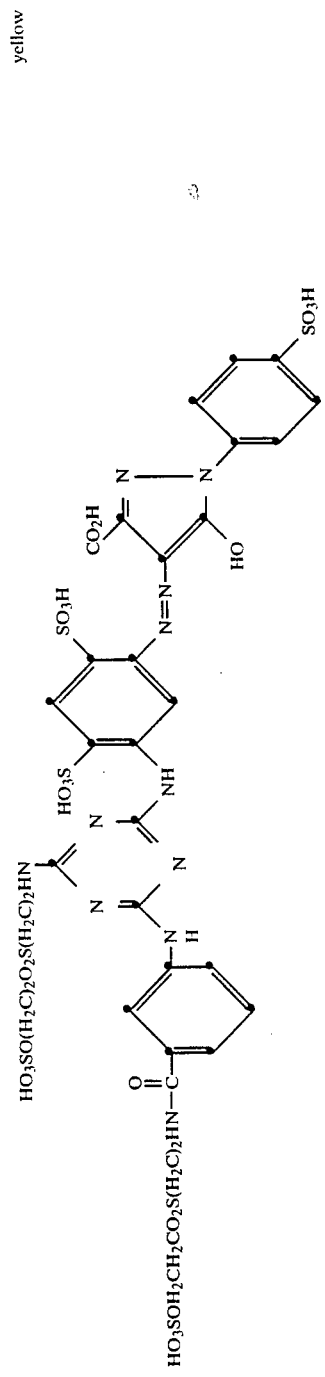 | yellow |

-continued
| Example | Reactive dye | Hue on cotton |
|---|---|---|
| 7) | 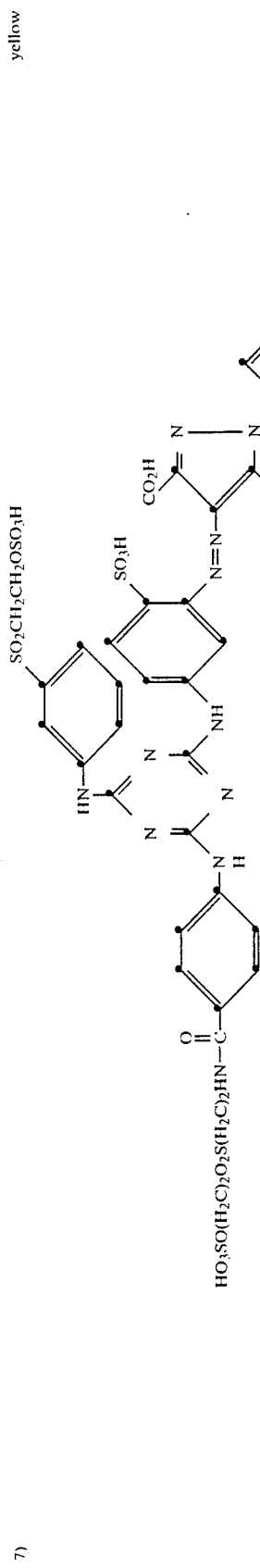 | yellow |
| 8) | 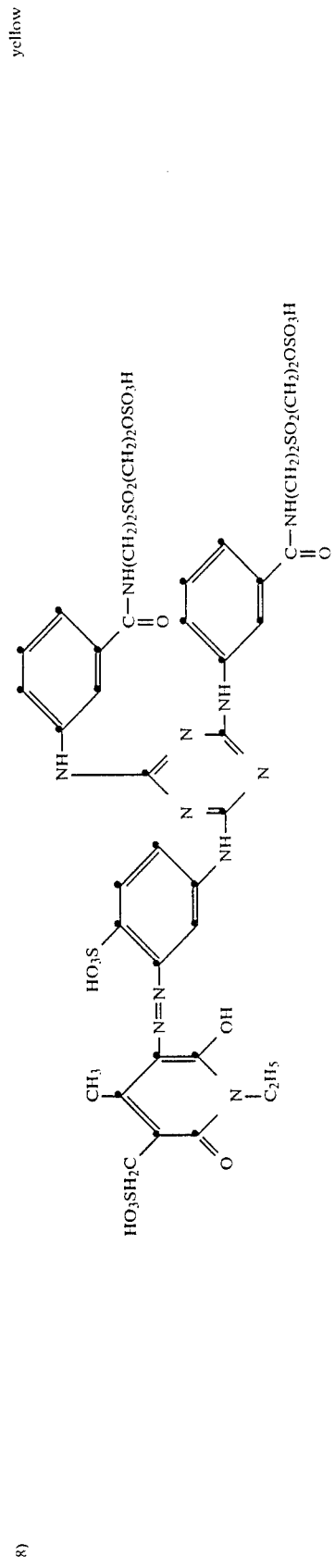 | yellow |

-continued
| Example | Reactive dye | Hue on cotton |
|---|---|---|
| 9) | 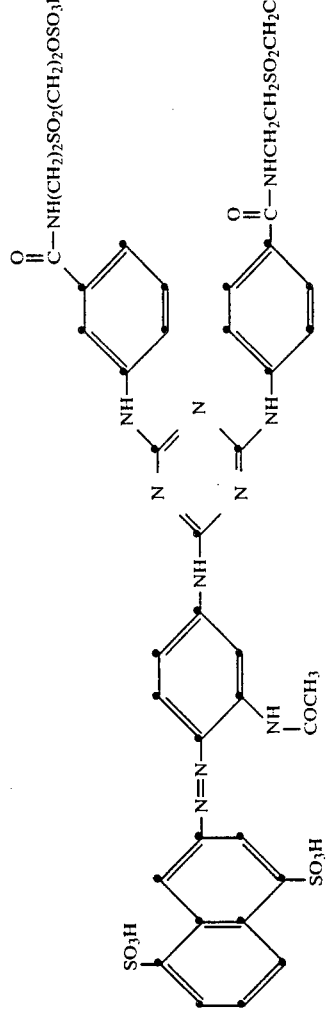 | golden yellow |
| 10) | 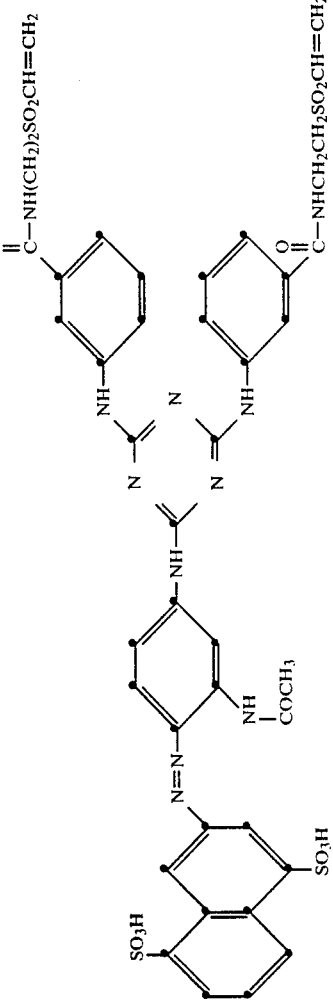 | golden yellow |

-continued

| Example | Reactive dye | Hue on cotton |
|---|---|---|
| 11) | Naphthalene(SO$_3$H)(HO$_3$S)–N=N–C$_6$H$_3$(NHCONH$_2$)–NH–[triazine]–NH–C$_6$H$_4$–C(=O)–NHCH$_2$CH$_2$SO$_2$CH$_2$CH$_2$OSO$_3$H, with triazine second substituent –NH–C$_6$H$_4$–C(=O)–NHCH$_2$CH$_2$SO$_2$CH$_2$CH$_2$OSO$_3$H | golden yellow |
| 12) | Naphthalene(SO$_3$H)(HO$_3$S)–N=N–C$_6$H$_3$(NHCONH$_2$)–NH–[triazine]–NH–C$_6$H$_4$–C(=O)–NH(CH$_2$)$_2$SO$_2$CH=CH$_2$, with triazine second substituent –NH–C$_6$H$_4$–SO$_2$CH=CH$_2$ | golden yellow |
| 13) | Naphthalene(SO$_3$H)(HO$_3$S)–N=N–C$_6$H$_3$(NHCONH$_2$)–NH–[triazine]–NH–C$_6$H$_4$–C(=O)–NH–(CH$_2$)$_2$NH(CH$_2$)$_2$SO$_2$CH$_2$–CH$_2$Cl, with triazine second substituent –NH–C$_6$H$_4$–SO$_2$CH$_2$CH$_2$OSO$_3$H | golden yellow |

| Example | Reactive dye | Hue on cotton |
|---|---|---|
| 14) | 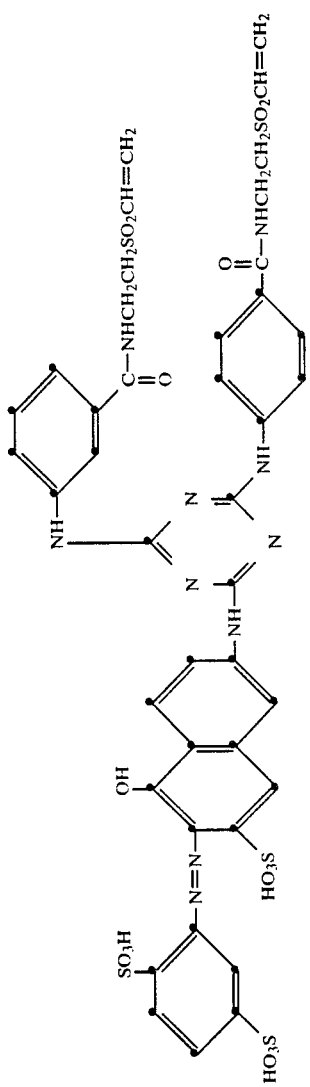 | golden orange |
| 15) | 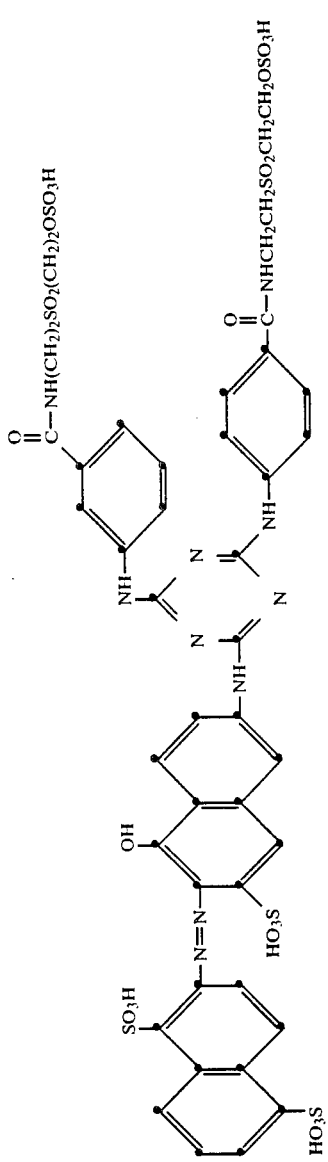 | orange |
| 16) | 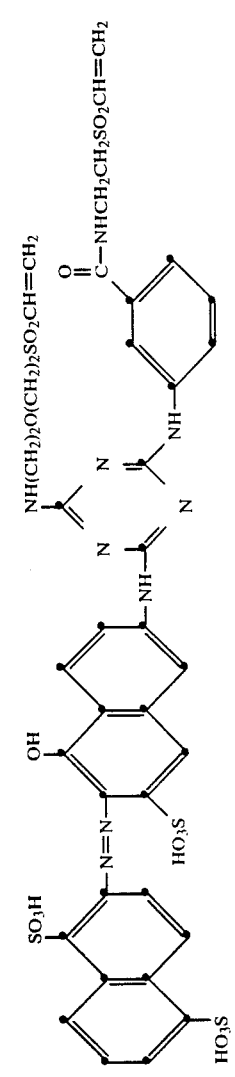 | orange |

-continued

| Example | Reactive dye | Hue on cotton |
|---|---|---|
| 17) | (structure) | scarlet |
| 18) | (structure) | orange |
| 19) | (structure) | brown |

| Example | Reactive dye | Hue on cotton |
|---|---|---|
| 20) | 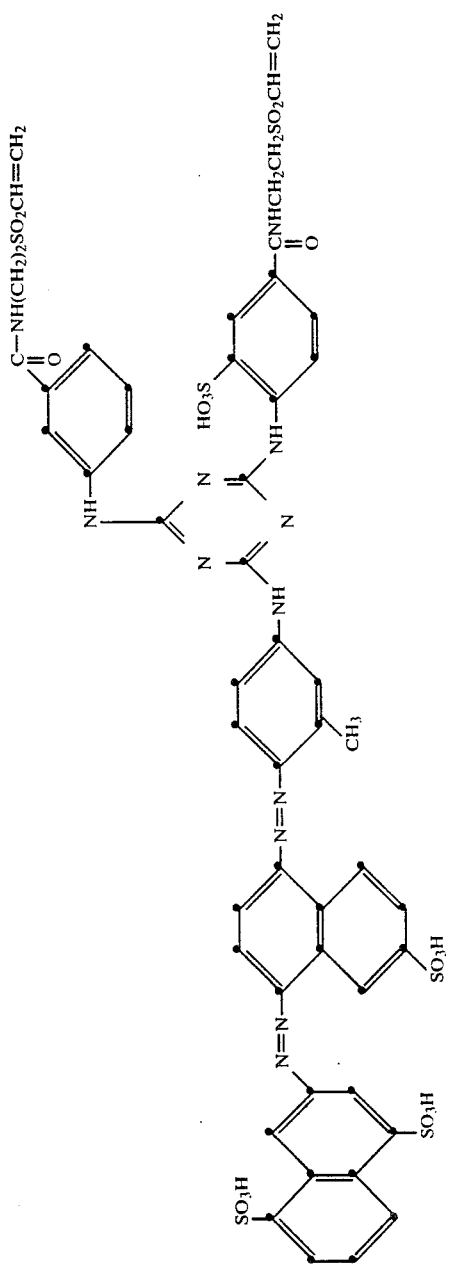 | brown |
| 21) | 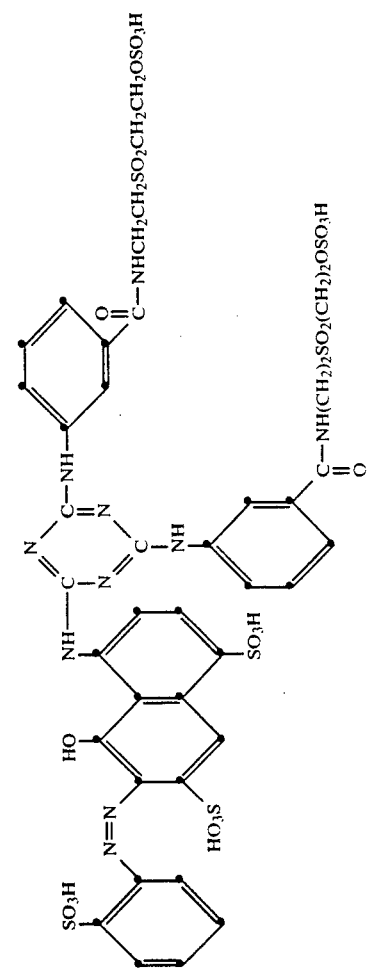 | scarlet |

-continued

| Example | Reactive dye | Hue on cotton |
|---|---|---|
| 22) | (structure) | red |
| 23) | (structure) | red |
| 24) | (structure) | red |

-continued
| Example | Reactive dye | Hue on cotton |
|---|---|---|
| 25) | 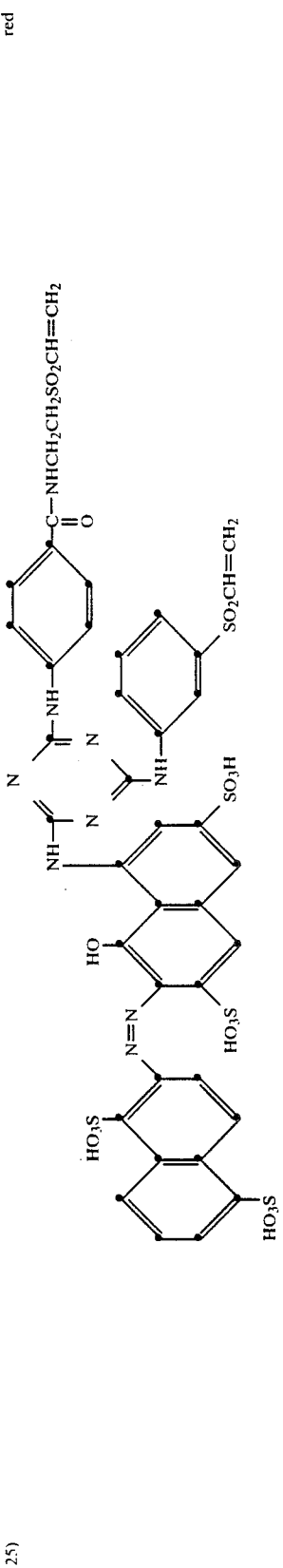 | red |
| 26) | 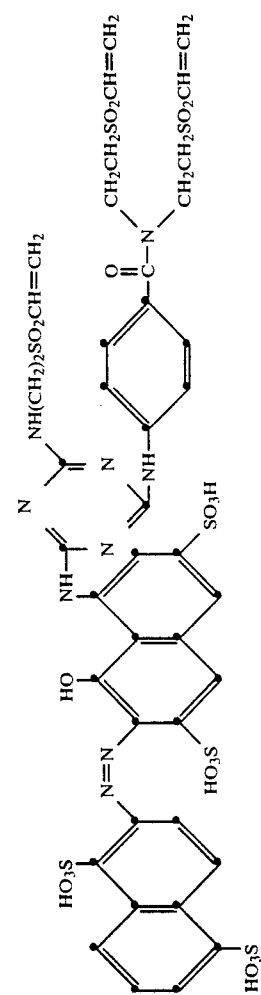 | red |

| Example | Reactive dye | Hue on cotton |
|---|---|---|
| 27) | 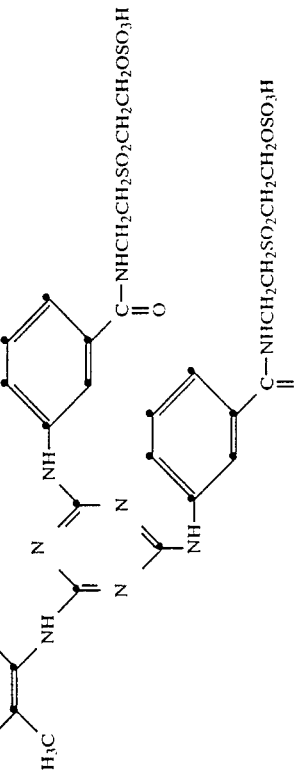 | blue |
| 28) | 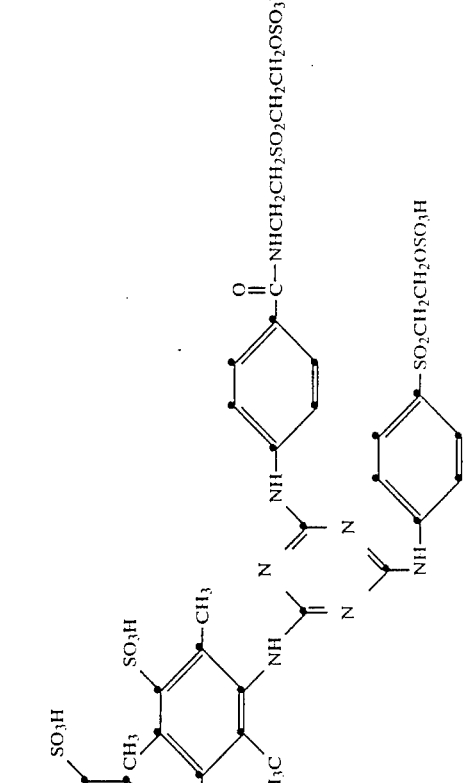 | blue |

-continued

| Example | Reactive dye | Hue on cotton |
|---|---|---|
| 29) | anthraquinone dye with $NH_2$, $SO_3H$, $SO_3H$, $NH$— triazine linked to —NH—phenyl—C(O)—N($CH_2CH_2SO_2CH_2CH_2OSO_3H$)$_2$ and triazine —NH(CH$_2$)$_2$O(CH$_2$)$_2$SO$_2$(CH$_2$)$_2$OSO$_3$H | blue |
| 30) | anthraquinone dye with $NH_2$, $SO_3H$, $SO_3H$, $NH$— triazine linked to —NH—phenyl—SO$_2$CH$_2$CH$_2$OSO$_3$H and triazine —NH—phenyl—C(O)—NHCH$_2$CH$_2$SO$_2$CH$_2$CH$_2$OSO$_3$H | blue |
| 31) | anthraquinone dye with $NH_2$, $SO_3H$, $NH$— triazine linked to —NH—phenyl—C(O)—NH(CH$_2$)$_2$SO$_2$(CH$_2$)$_2$OSO$_3$H and triazine —NH—phenyl(HO$_3$S)—C(O)—NHCH$_2$CH$_2$SO$_2$CH$_2$CH$_2$OSO$_3$H | blue |

-continued
| Example | Reactive dye | Hue on cotton |
|---|---|---|
| 32) | 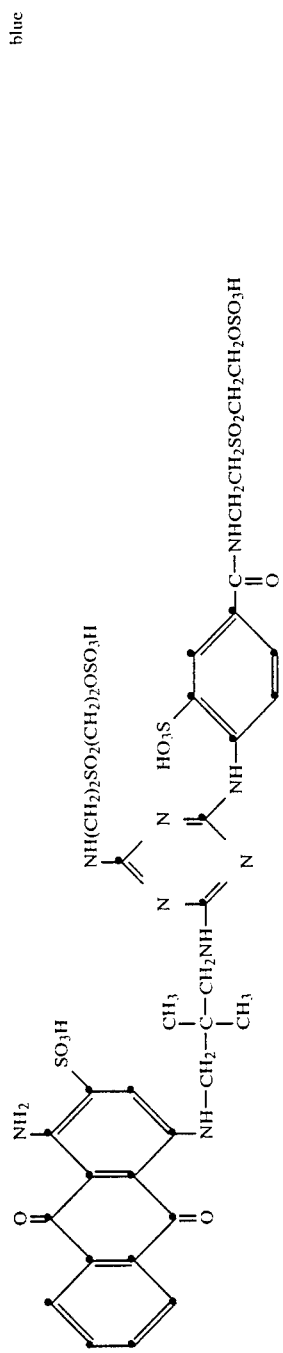 | blue |
| 33) | 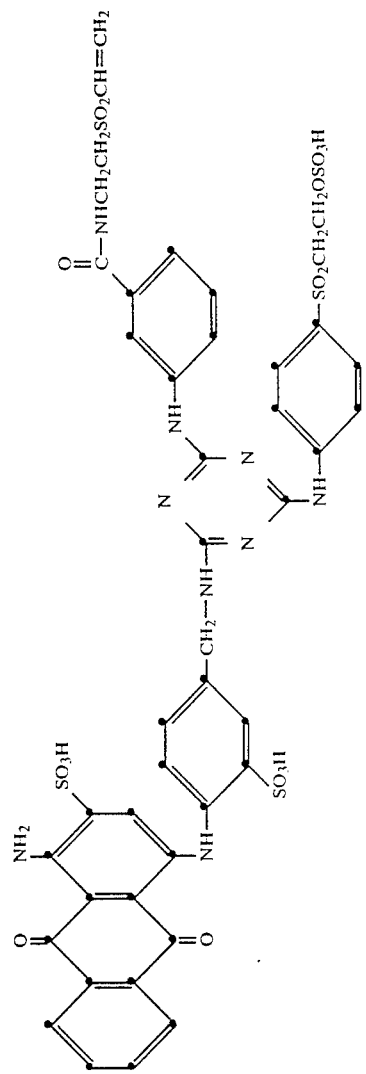 | blue |

-continued
| Example | Reactive dye | Hue on cotton |
|---|---|---|
| 34) | 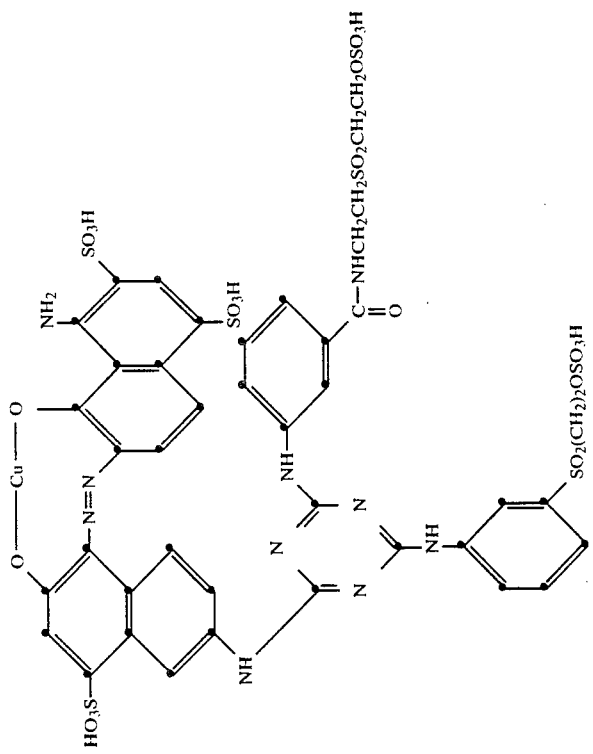 | blue |

-continued

| Example | Reactive dye | Hue on cotton |
|---|---|---|
| 35) | (structure) | blue |
| 36) | (structure) | blue |

| Example | Reactive dye | Hue on cotton |
|---|---|---|
| 37) | 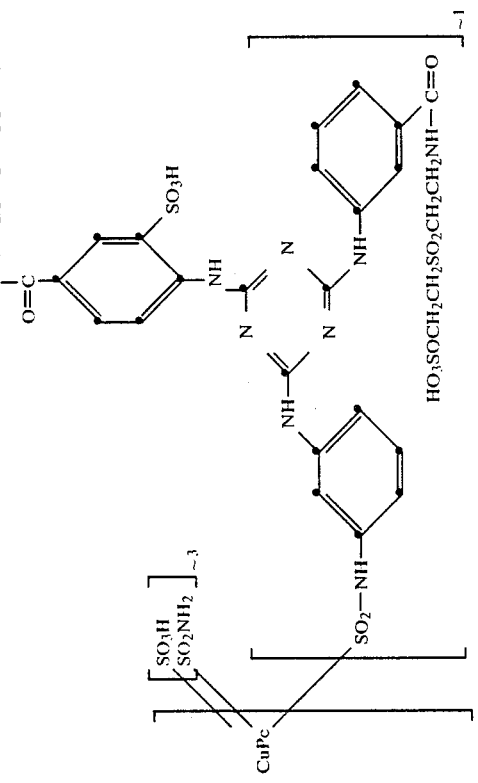 | turquoise |
| 38) | 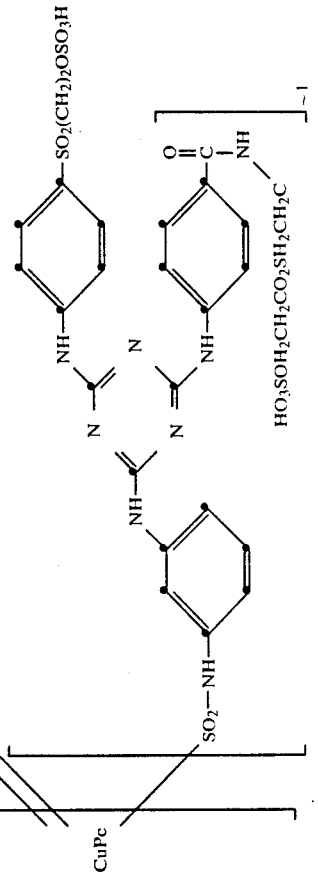 | turquoise |

-continued
| Example | Reactive dye | Hue on cotton |
|---|---|---|
| 39) | 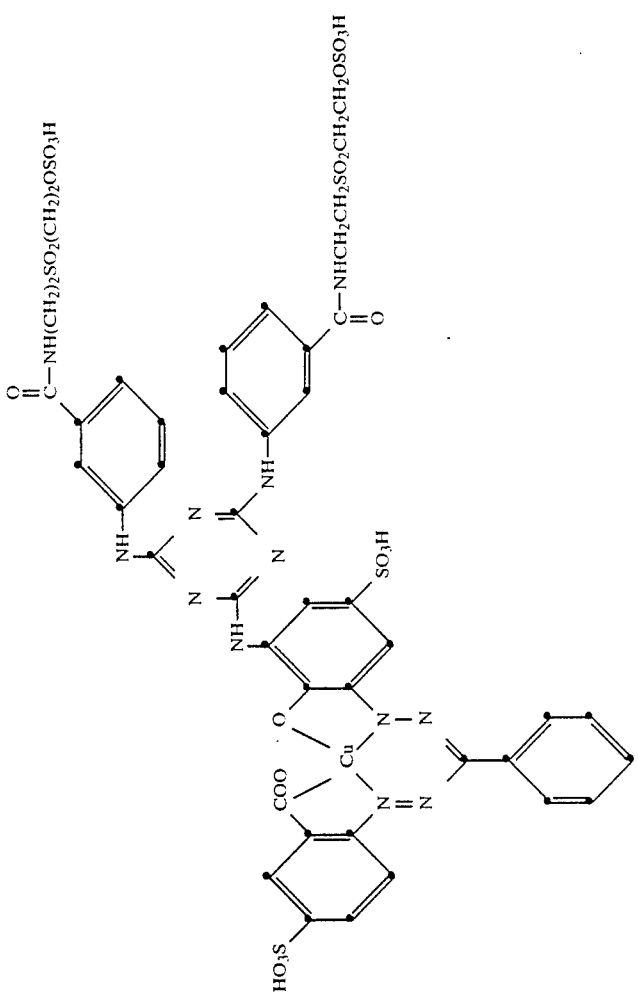 | blue |

-continued
| Example | Reactive dye | Hue on cotton |
|---|---|---|
| 40) | 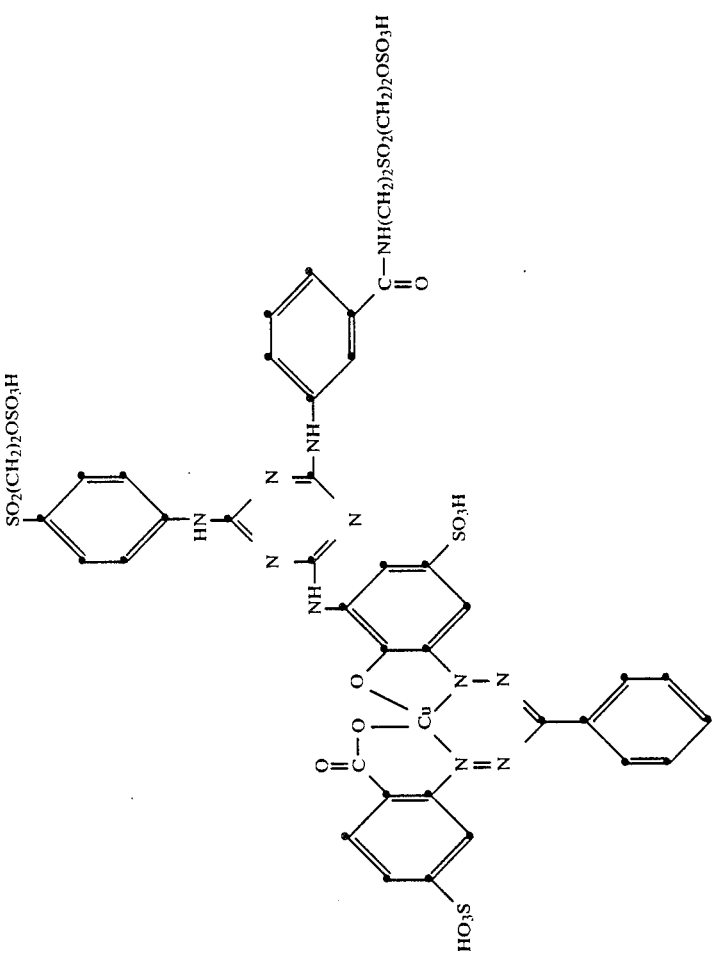 | blue |

-continued
| Example | Reactive dye | Hue on cotton |
|---|---|---|
| 41) | 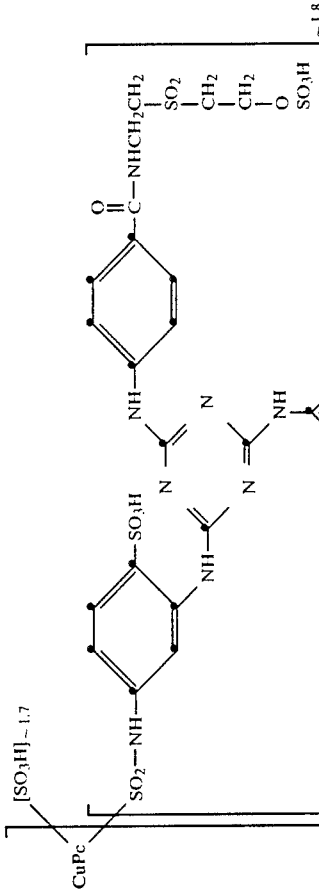 | turquoise |
| 42) | 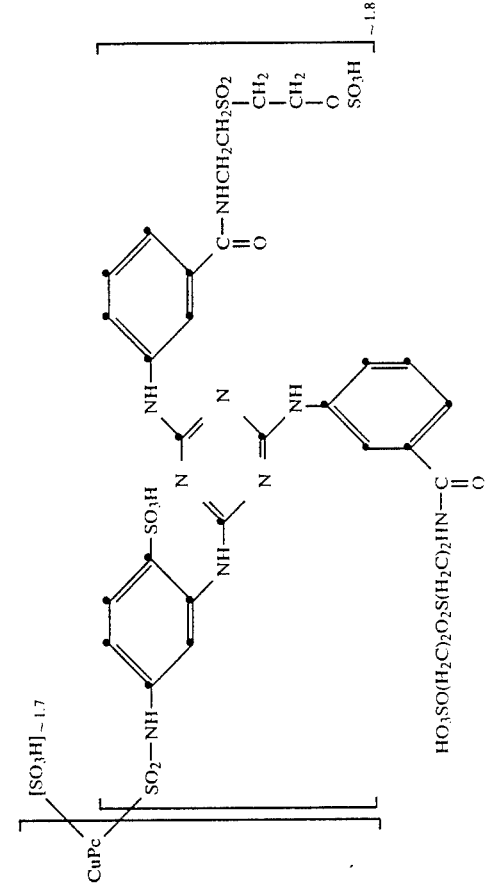 | turquoise |

DYEING METHOD I 2 parts of the dye obtained in Example 1 are dissolved in 400 parts of water; to this solution are added, 1,500 parts of a solution which contains per liter 53 g of sodium chloride. 100 parts of a cotton fabric are introduced at 40° C. into this dyebath. After 45 minutes 100 parts of a solution which contains per liter 16 g of sodium hydroxide and 20 g of calcined sodium carbonate are added. The temperature of the dyebath is held at 40° C. for a further 45 minutes. The dyed fabric is then rinsed, is soaped off at the boil with a nonionic detergent for a quarter of an hour, is rinsed once more and is dried.

DYEING METHOD II 2 parts of the reactive dye obtained in Example 1 are dissolved in 400 parts of water, to this solution are added 1,500 parts of a solution which contains per liter 53 g of sodium chloride. 100 parts of a cotton fabric are introduced at 35° C. into this dyebath. After 20 minutes 100 parts of a solution which contains per liter 16 g of sodium hydroxide and 20 g of calcined sodium carbonate are added. The temperature of the dyebath is held at 35° C. for a further 15 minutes. The temperature is then raised to 60° C. in the course of 20 minutes. The temperature is held at 60° C. for a further 35 minutes. The fabric is then rinsed, is soaped off at the boil with a nonionic detergent for a quarter of an hour, is rinsed once more and is dried.

DYEING METHOD III 8 parts of the reactive dye obtained in Example 1 are dissolved in 400 parts of water; to this solution are added 1,400 parts of a solution which contains per liter 100 g of sodium sulfate. 100 parts of a cotton fabric are introduced at 25° C. into this dyebath. After 10 minutes 200 parts of a solution which contains per liter 150 g of trisodium phosphate are added. The temperature of the dyebath is then raised to 60° C. in the course of 10 minutes. The temperature is held at 60° C. for a further 90 minutes. The fabric is then rinsed, is soaped off at the boil with a nonionic detergent for a quarter of an hour, is rinsed once more and is dried.

DYEING METHOD IV 4 parts of the reactive dye obtained in Example 1 are dissolved in 50 parts of water; to this solution are added 50 parts of a solution which contains per liter 5 g of sodium hydroxide and 20 g of calcined sodium carbonate. The resulting solution is applied to a cotton fabric on a pad-mangle in such a way that its weight increases by 70%, and the fabric is then wound onto a beam. In this state the cotton fabric is left to stand at room temperature for 3 hours. The dyed fabric is then rinsed, is soaped off at the boil with a nonionic detergent for a quarter of an hour, is rinsed once more and is dried.

DYEING METHOD V 6 parts of the reactive dye obtained in Example 1 are dissolved in 50 parts of water; to this solution are added 50 parts of a solution which contains per liter 16 g of sodium hydroxide and 0.04 liter of 38° Bé sodium silicate. The resulting solution is applied to a cotton fabric on a pad-mangle in such a way that its weight increases by 70%, and the fabric is then wound onto a beam. In this state the cotton fabric is left at room temperature for 10 hours. The dyed fabric is then rinsed, is soaped off at the boil with a nonionic detergent for a quarter of an hour, is rinsed once more and is dried.

DYE METHOD VI 2 parts of the reactive dye obtained in Example 1 are dissolved in 100 parts of water in the presence of 0.5 part of sodium m-nitrobenzenesulfonate. The resulting solution is used to impregnate a cotton fabric in such a way that its weight increased by 75%, and the fabric is then dried. The fabric is then impregnated with a warm solution at 20° C. which contains per liter 4 g of sodium hydroxide and 300 g of sodium chloride, and is squeezed to a 75% weight increase and the dyeing is steamed at 100° to 102° C. for 30 seconds, is rinsed, is soaped off at the boil with a 0.3% strength solution of a nonionic detergent for a quarter of an hour, is rinsed and is dried.

DYEING METHOD VII 2 parts of the dye of Example 1, 160 parts of sodium sulfate and, as a buffer, 4 parts of $Na_2HPO_4.12H_2O$ and 1 part of $KH_2PO_4$ are added to 2000 parts of water, forming a dyebath at pH 7. This dyebath is entered with 100 parts of non-mercerized cotton knitwear. The temperature of the bath is brought to 130° C. in the course of 30 minutes, and dyeing is carried out at that temperature for 60 minutes. The dyed fabric is then taken from the bath, washed with water, soaped off, washed again with water and dried. A deep red dyeing is obtained.

DYEING METHOD VIII 2 parts of the dye of Example 1, 2 parts of the known water-insoluble anthraquinone deye of the formula

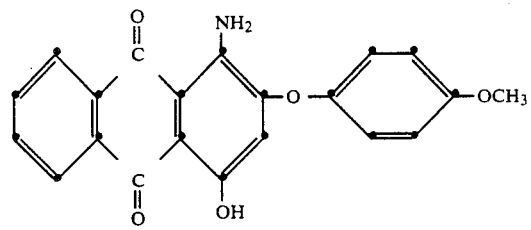

120 parts of sodiumsulfate, and, as a buffer, 4 parts of $Na_2HPO_4.12H_2O$ and 1 part of $KH_2PO_4$ are added to 200 parts of water. The resulting dyebath is entered with 100 parts of a 50:50 polyester/cotton blend fabric, and the temperature of the bath is raised to 130° C. in the course of 30 minutes and is maintained at this level for 60 minutes' dyeing. The dyed fabric is then removed from the bath, washed with water, soaped off, washed again with water and dried. The result obtained is a level red dyeing on the fabric. The dyebath is maintained at pH 7 prior to and during the dyeing.

PRINTING METHOD I 3 parts of the reactive dye obtained in Example 1 are sprinkled with high-speed stirring into 100 parts of stock thickening containing 50 parts of 5% strength sodium alginate thickening, 27.8 parts of water, 20 parts of urea, 1 part of sodium m-nitrobenzenesulfonate and 1.2 parts of sodium hydrogencarbonate. The print paste thus obtained is used to print a cotton fabric which is then dried, and the resulting printed fabric is steamed at 102° C. in saturated steam for 2 minutes. The printed fabric is then rinsed, if desired soaped off at the boil and rinsed once more, and is then dried.

PRINTING METHOD II 5 parts of the reactive dye obtained in Example 1 are sprinkled with high-speed stirring into 100 parts of a stock thickening containing 50 parts of 5% strength sodium alginate thickening, 36.5 parts of water, 10 parts of urea, 1 part of sodium m-nitrobenzenesulfonate and 2.5 parts of sodium hydrogencarbonate. The print paste thus obntained, whose stability meets industrial requirements, is used to print a cotton fabric, which is then dried, and the resulting printed fabric is steamed at 102° C. in saturated steam for 8 minutes. The printed fabric is then desired, if desired soaped off at the boil and rinsed once more, and is then dried.

What is claimed is:

1. A reactive dye of the formula

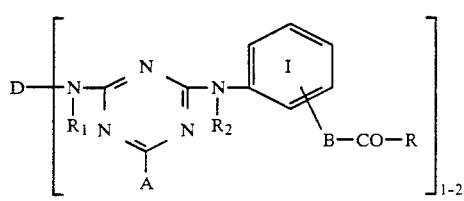

(1)

where D is the radical of a monoazo, polyazo, metal complex azo, anthraquinone, phthalocyanine, formazan, azomethine, dioxazine, phenazine, stibene, triphenylmethane, xanthene, thioxanthone, nitroaryl, naphthoquinone, pyrenequinone or perylenetetracarbimide dye, $R_1$ and $R_2$ are independently of each other hydrogen, alkyl having 1 to 4 carbon atoms or alkyl having 1 to 4 carbon atoms substituted by halogen, hydroxyl, cyano, $C_1$–$C_4$alkoxy, $C_1$–$C_4$alkoxycarbonyl, carboxyl, sulfamoyl, sulfo or sulfato, B is a direct bond or a radical —$(CH_2)$—$_n$ or —O—$(CH_2)$—$_n$, n is 1, 2, 3, 4, 5 or 6, R is a radical of the formula

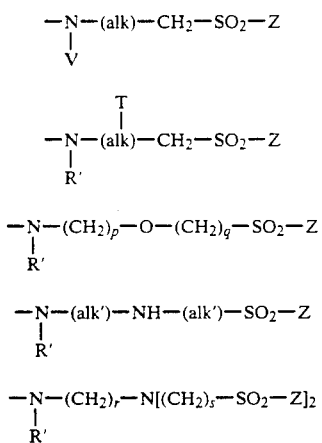

or where R' is hydrogen or $C_1$–$C_6$alkyl, alk is alkylene having 1 to 7 carbon atoms or a branched isomer thereof, T is hydrogen, halogen, hydroxyl, sulfato, carboxyl, cyano, $C_2$–$C_4$alkanoyloxy, $C_1$–$C_4$alkoxycarbonyl, carbamoyl or a radical —$SO_2$—Z, V is hydrogen, $C_1$–$C_4$alkyl, $C_1$–$C_4$alkyl substituted by halogen, hydroxyl, cyano, $C_1$–$C_4$alkoxy, $C_1$–$C_4$alkoxycarbonyl, carboxyl, sulfamoyl, sulfo or sulfato, or a radical of the formula —(alk)—$CH_2$—$SO_2$—Z, where (alk) is as defined above, each alk' is independently of the other polymethylene having 2 to 6 carbon atoms or a branched isomer thereof, Z is β-sulfatoethyl, β-thiosulfatoethyl, β-phosphatoethyl, β-acyloxyethyl, β-haloethyl or vinyl, p, q, r and t are each independently of the others 1, 2, 3, 4, 5 or 6, s is 2, 3, 4, 5 or 6, and A is a radical of the formula

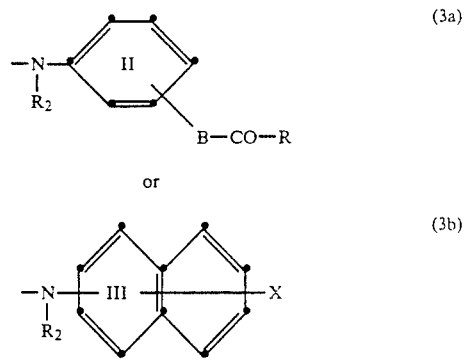

where $R_2$, B and R are as defined above, X is a radical —$SO_2$—Z or —$N(R_3)$—$SO_2Z$, where Z is as defined above, and $R_3$ is hydrogen, methyl or ethyl, or where A is a radical which is bonded directly to the triazine ring and has the formula (2a), (2b), (2c), (2d), (2e) or (2f) where R', T alk, V, alk', Z, p, q, r, s, and t are as defined above; if it is a radical of the formula (3a), A can be different from the corresponding radical in the formula (1) which includes the benzene nucleus I, and the benzene nuclei I and II or the benzene or naphthalene nucleus III are independently of each other unsubstituted or substituted by alkyl groups having 1 to 4 carbon atoms, alkoxy groups having 1 to 8 carbon atoms, amino, alkylamino having 1 to 4 carbon atoms, phenylamino, N,N-di-β-hydroxyethylamino, N,N-di-β-sulfatoethylamino, sulfobenzylamino, N,N-disulfobenzylamino, alkoxycarbonyl having 1 to 4 carbon atoms in the alkoxy radical, alkylsulfonyl having 1 to 4 carbon atoms, alkanoyl having 2 to 4 carbon atoms, trifluoromethyl, nitro, cyano, halogen, carbamoyl, N-alkylcarbamoyl having 1 to 4 carbon atoms in the alkyl radical, sulfamoyl, N-alkylsulfamoyl having 1 to 4 carbon atoms, N-(β-hydroxyethyl)sulfamoyl, N,N-di-(β-hydroxyethyl)sulfamoyl, N-phenylsulfamoyl, ureido, hydroxyl, carboxyl, sulfomethyl or sulfo.

2. A reactive dye according to claim 1 of the formula

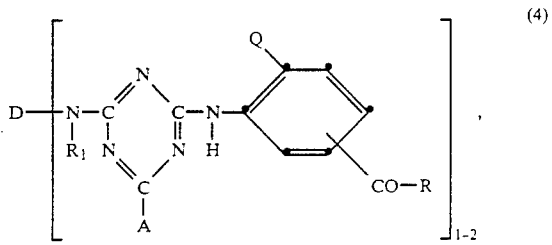

(4)

where D and R are as defined in claim 1. $R_1$ is hydrogen, methyl of ethyl. Q is hydrogen, $C_1$–$C_4$alkyl, $C_1$–C-

4alkoxy, halogen, carboxyl or sulfo, and A is a radical of the formula

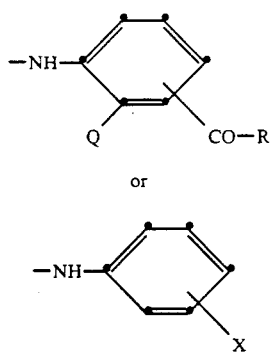

(5a)

or

-NH—⟨benzene⟩—X (5b)

where Q is as defined above, and R and X are as defined in claim 1, or A, if it is a radical of the formula (5a), can be different from the corresponding radical present in the formula (4).

3. A reactive dye according to claim 2, wherein D and $R_1$ are as defined in claim 2, Q is hydrogen or sulfo, R is a radical of the formula (2a), (2b), (2c), (2d), (2e) or (2f), where Z is β-sulfatoethyl, β-chloroethyl or vinyl, and X is β-sulfatoethylsulfonyl or vinylsulfonyl.

4. A reactive dye according to claim 3, wherein R is a radical of the formula

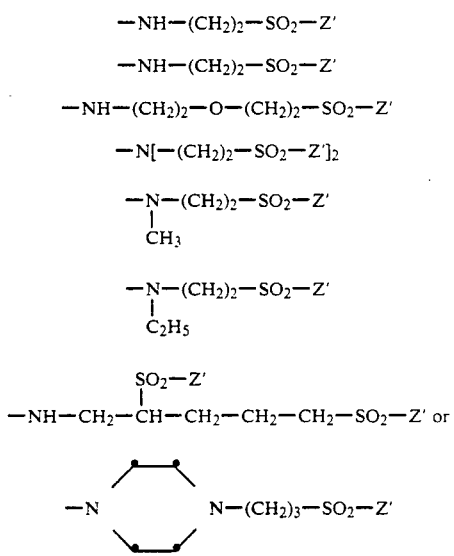

where Z′ is β-sulfatoethyl, β-chloroethyl or vinyl.

5. A reactive dye according to claim 1, wherein D is the radical of a monoazo or disazo dye.

6. A reactive dye according to claim 1, wherein D is the radical of a metal complex azo or formazan dye.

7. A reactive dye according to claim 1, wherein D is the radical of an anthraquinone dye.

8. A reactive dye according to claim 1, wherein D is the radical of a phthalocyanine dye.

9. A reactive dye according to claim 1, wherein D is the radical of a dioxazine dye.

10. A reactive dye according to claim 5, wherein D is a monoazo or disazo dye radical of the formula $$D_1-N{=}N-(M-N{=}N)_u-K- \quad (6a),$$

$$-D_1-N{=}N-(M-N{=}N)_u-K \quad (6b),$$

or $$-D_1-N{=}N-(M-N{=}N)_u-K- \quad (6c).$$

or of a metal complex derived therefrom, $D_1$ is the benzene or naphthalene radical of a diazo component, M is a benzene or naphthalene radical, and K is a benzene, naphthalene, pyrazolone, 6-hydroxy-2-pyridine or acetoacetarylamide radical of a coupling component, $D_1$, M and K are each unsubstituted or substituted by hydroxyl, amino, methyl, ethyl, methoxy, ethoxy, alkanoylamino having 2 to 4 carbon atoms, benzoylamino or halogen, u is 0 or 1, and $D_1$, M and K together contain at least two sulfo groups.

11. A reactive dye according to claim 5, wherein D is a disazo dye radical of the formula $$-D_1-N{=}N-K-N{=}N-D_2 \quad (7a).$$

or $$-D_1-N{=}N-K-N{=}N-D_2- \quad (7b),$$

where $D_1$ and $D_2$ are independently of each other the benzene or naphthalene radical of a diazo component, and K is a naphthalene radical or a coupling component, $D_1$, $D_2$ and K being unsubstituted or substituted by hydroxyl, amino, methyl, ethyl, methoxy, ethoxy, alkanoylamino having 2 to 4 carbon atoms, benzoylamino or halogen, and $D_1$, $D_2$ and K together contain at least two sulfo.

12. A reactive dye according to claim 6, wherein D is the radical of a 1:1 copper complex azo dye of the benzene or naphthalene series and the copper atom is bonded on either side to a metallizable group ortho to the azo bridge.

13. A reactive dye according to claim 6, wherein D is the radical of a formazan dye of the formula

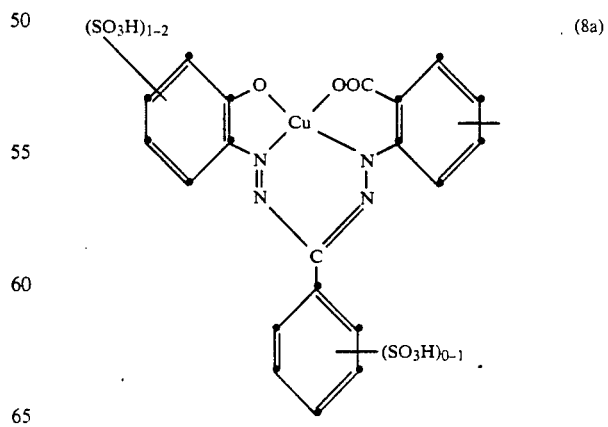

(8a)

or

-continued

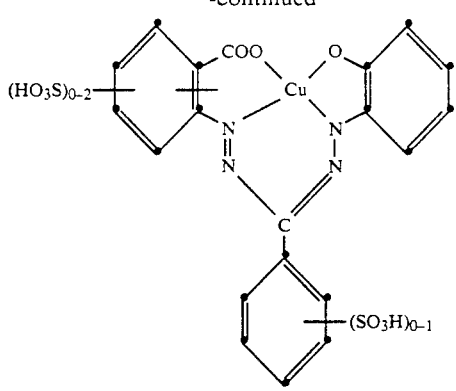
(8b)

where the benzene nuclei is unsubstituted or substituted by alkyl having 1 to 4 carbon atoms, alkoxy having 1 to 4 carbon atoms, alkylsulfonyl having 1 to 4 carbon atoms, halogen or carboxyl.

14. A reactive dye according to claim 7, wherein D is the radical of an anthraquinone dye of the formula

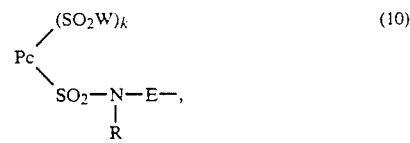

radical is unsubstituted or substituted by alkyl having 1 to 4 carbon atoms, alkoxy having 1 to 4 carbon atoms, halogen, carboxyl or sulfo.

15. A reactive dye according to claim 8, wherein D is the radical of a phthalocyanine dye of the formula $$Pc \underset{SO_2-N-E-}{\overset{(SO_2W)_k}{\diagup}}$$
$$\qquad\qquad\ \ |$$
$$\qquad\qquad\ \ R$$
(10)

where Pc is the radical of a copper or nickel phthalocyanine, W is —OH and/or —NR$_5$R$_6$, R$_5$ and R$_6$ are independently of each other hydrogen or alkyl having 1 to 4 carbon atoms which is unsubstituted or substituted by hydroxyl or sulfo, R$_4$ is hydrogen or alkyl having 1 to 4 carbon atoms, E is a phenylene radical which is substituted or substituted by alkyl having 1 to 4 carbon atoms, halogen, carboxyl or sulfo, or is an alkylene radical having 2 to 6 carbon atoms and k is 1, 2 or 3.

16. A reactive dye according to claim 9, wherein D is the radical of a dioxazine dye of the formula

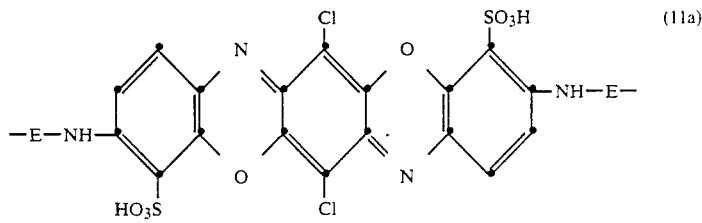
(11a)

or

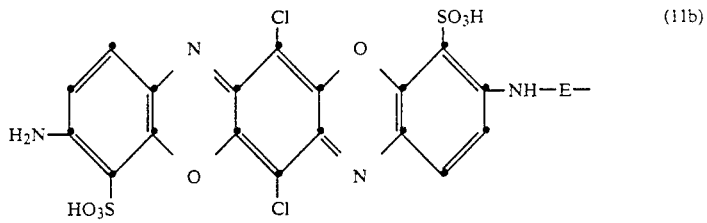
(11b)

(9)

where E is a phenylene radical which is unsubstituted or substituted by alkyl having 1 to 4 carbon atoms, halogen, carboxyl or sulfo or is an alkylene radical having 2 to 6 carbon atoms, and the outer benzene rings in the formulae (11a) and (11b) is unsubstituted or further substituted by alkyl having 1 to 4 carbon atoms, alkoxy having 1 to 4 carbon atoms, acetylamino, nitro, halogen, carboxyl or sulfo.

17. A reactive dye according to claim 10, of the formulae (12) to (23)

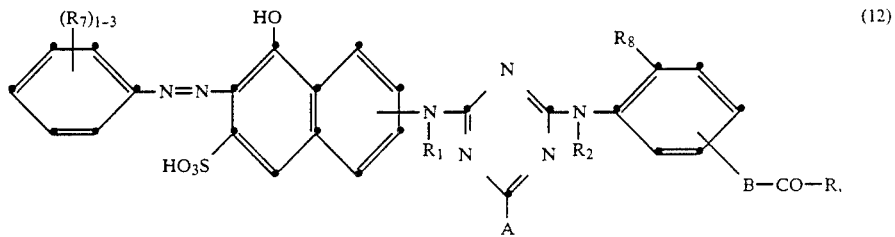
(12)

where G is a phenylene, cyclohexylene or C$_2$-C$_6$alkylene radical, the anthraquinone nucleus is substituted or substituted by a further sulfo group and the phenyl where (R$_7$)$_{1-3}$ is 1 to 3 substituents from the group consisting of C$_{1-4}$alkyl, C$_{1-4}$alkoxy, halogen, carboxyl and sulfo, $R_8$ is hydrogen, $C_{1-4}$alkyl, $C_{1-4}$alkoxy, halogen, hydroxyl, carboxyl or sulfo, and $R_1$, $R_2$, A, B and R are as defined in claim 1;

where $(R_{10})_{1-3}$ is 1–3 substituents from the group consisting of $C_{1-4}$alkyl, $C_{1-4}$alkoxy, halogen, carboxyl and sulfo, and $R_2$, A, B, R and $R_8$ are as defined under the formula (12);

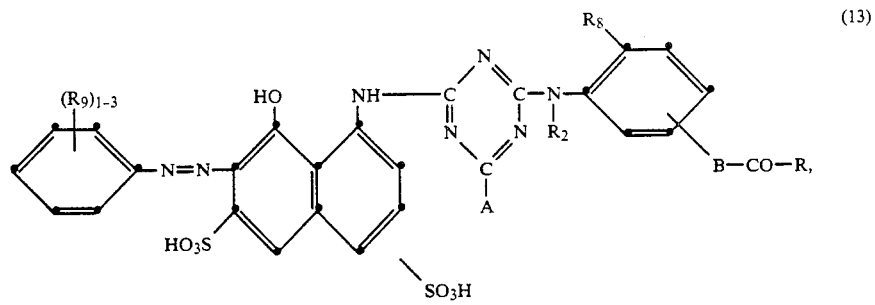

where $(R_9)_{1-3}$ is 1 to 3 substituents from the group consisting of $C_{1-4}$alkyl, $C_{1-4}$alkoxy, halogen, carboxyl and sulfo, and $R_2$, A, B, R and $R_8$ are as defined under the formula (12);

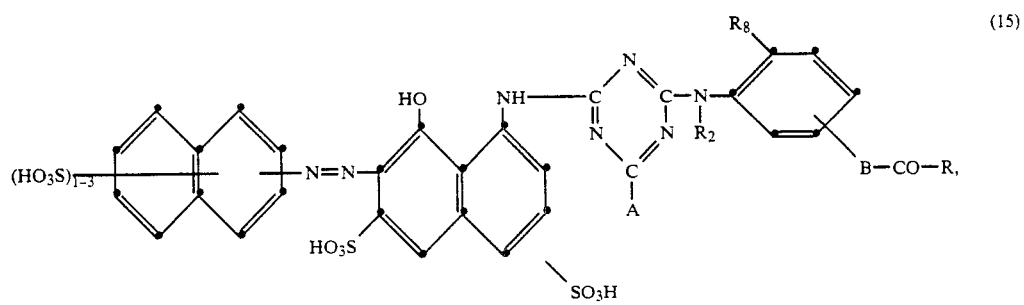

where $R_2$, A, B, R and $R_8$ are as defined under the formula (12);

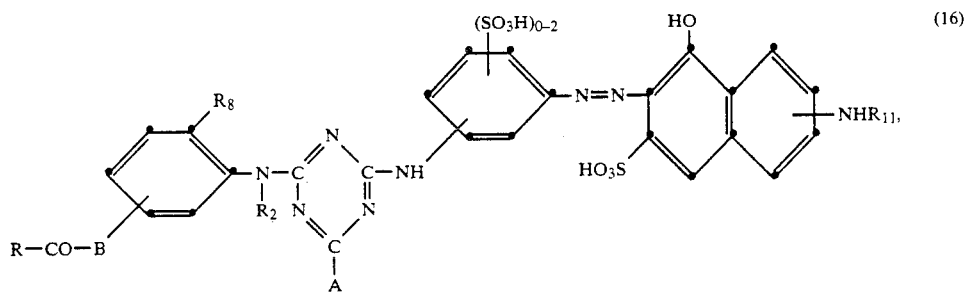

formula (12);

where $R_{11}$ is $C_{2-4}$alkanoyl or benzoyl, and $R_2$, A, B, R and $R_8$ are as defined under the formula (12);

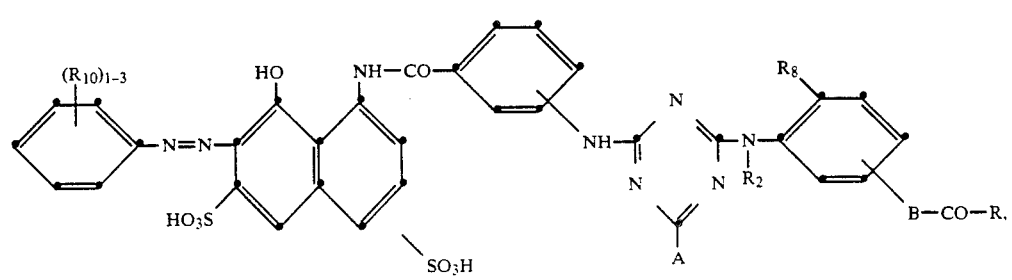

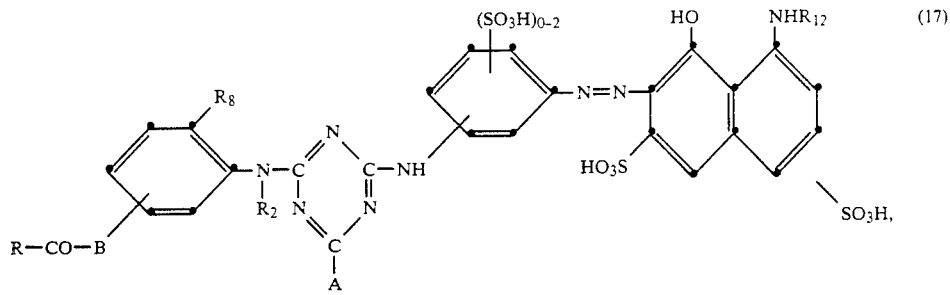
(17)

where $R_{12}$ is $C_{2-4}$alkanoyl or benzoyl, and $R_2$, A, B, R and $R_8$ are as defined under the formula (12);

and sulfo, and $R_2$, A, B, R and $R_8$ are as defined under the formula (12);

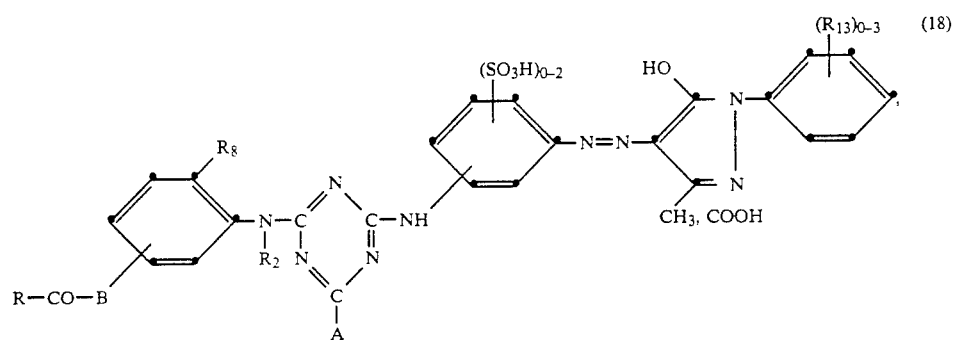
(18)

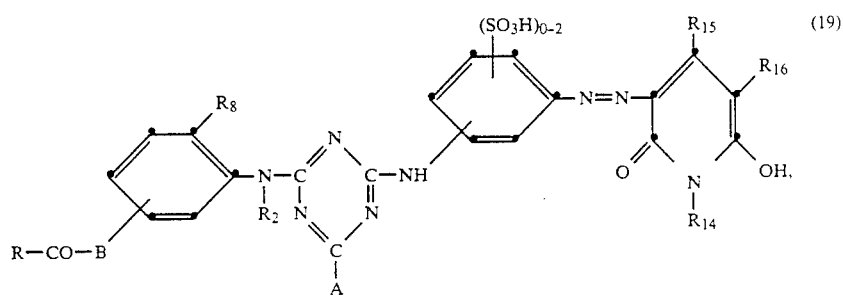
(19)

where $(R_{13})_{0-3}$ is 0 to 3 substituents from the group consisting of $C_{1-4}$alkyl, $C_{1-4}$alkoxy, halogen, carboxyl where $R_{14}$ and $R_{15}$ are independently of each other hydrogen, $C_{1-4}$alkyl or phenyl, $R_{16}$ is hydrogen, cyano, carbamoyl or sulfomethyl, and $R_2$, A, B, R and $R_8$ are as defined under the formula (12);

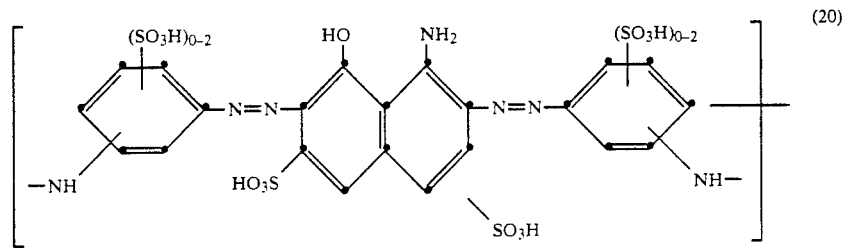
(20)

-continued

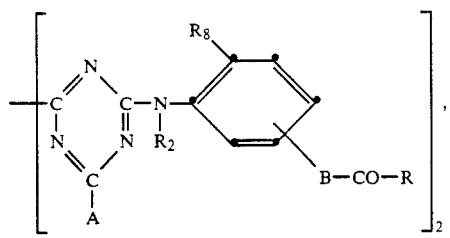

where $R_2$, A, B, R and $R_8$ are as defined under the formula (12);

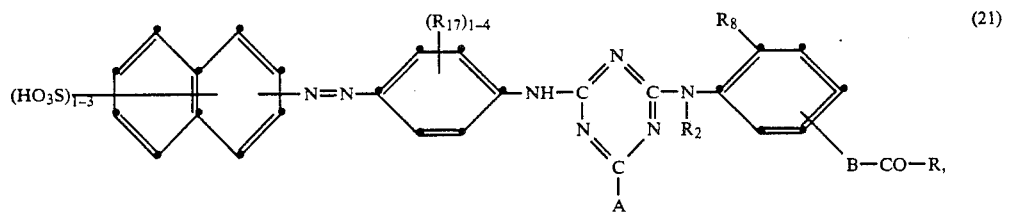

where $(R_{17})_{1-4}$ is 1 to 4 substituents selected independently of one another from the group consisting of hydrogen, halogen, nitro, cyano, trifluoromethyl, sulfamoyl, carbamoyl, $C_{1-4}$alkyl, $C_{1-4}$alkoxy, amino, acetylamino, ureido, hydroxyl, carboxyl, sulfomethyl and sulfo, and $R_2$, A, B, R and $R_8$ are as defined under the formula (12);

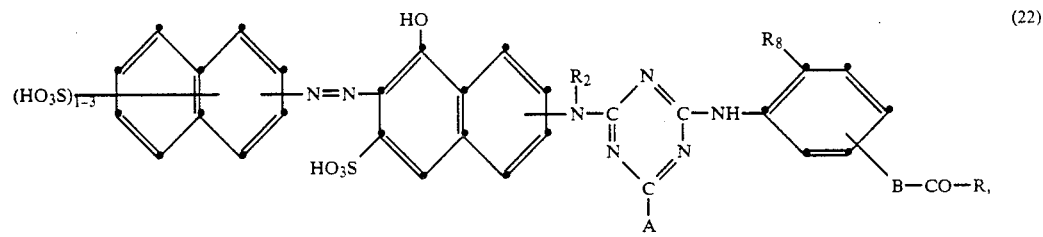

where A, B, R, $R_2$ and $R_8$ are as defined under the formula (12); or

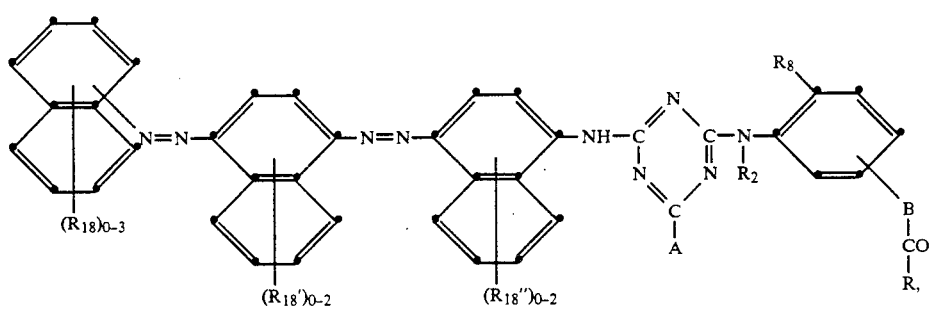

where A, B, R, $R_2$ and $R_8$ are as defined under the formula (12), $(R_{18})_{0-3}$, $(R_{18}')_{0-2}$ and $(R_{18}'')_{0-2}$ are independently of one another 0 to 3 or 0 to 2 substituents from the group consisting of $C_{1-4}$alkyl, $C_{1-4}$alkoxy and sulfo.

18. A reactive dye according to claim 17, wherein R is a radical of the formula $-NH-(CH_2)_2-SO_2-Z'$

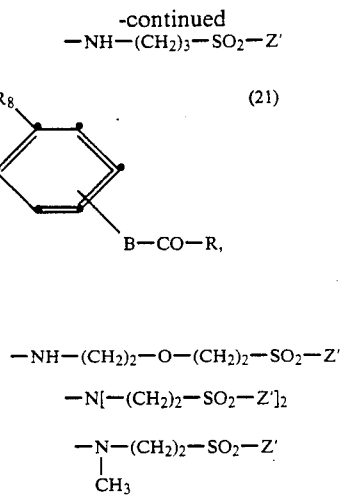

-continued
$-NH-(CH_2)_3-SO_2-Z'$ (21)

$-NH-(CH_2)_2-O-(CH_2)_2-SO_2-Z'$ $-N[-(CH_2)_2-SO_2-Z']_2$ $\underset{CH_3}{-N}-(CH_2)_2-SO_2-Z'$ (22)

$\underset{C_2H_5}{-N}-(CH_2)_2-SO_2-Z'$ (23)

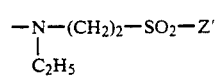

$-NH-CH_2-\underset{SO_2-Z'}{\overset{|}{C}H}-CH_2-CH_2-CH_2-SO_2-Z'$ or

-continued

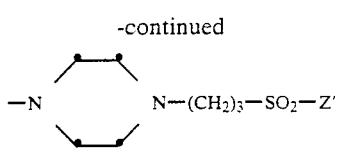

where Z' is β-sulfatoethyl, β-chloroethyl or vinyl, and/or A is a radical of the formula

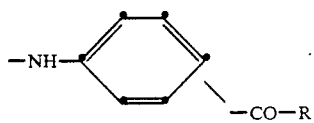

where R is as defined above, or is a radical of the formula

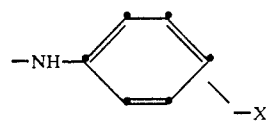

where X is —$SO_2$—Z' and Z' is as defined above, or is a radical of the formula

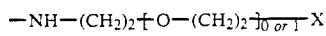

where X is as defined above, $R_2$ is hydrogen, $R_8$ is hydrogen or sulfo, and B is a direct bond.

19. A reactive dye according to claim 2, wherein D is the radical of a monoazo or disazo dye.
20. A reactive dye according to claim 3, wherein D is the radical of a monoazo or disazo dye.
21. A reactive dye according to claim 4, wherein D is the radical of a monoazo or disazo dye.
22. A reactive dye according to claim 2, wherein D is the radical of a metal complex azo or formazan dye.
23. A reactive dye according to claim 3, wherein D is the radical of a metal complex azo or formazan dye.
24. A reactive dye according to claim 4, wherein D is the radical of a metal complex azo or formazan dye.
25. A reactive dye according to claim 2, wherein D is the radical of an anthraquinone dye.
26. A reactive dye according to claim 3, wherein D is the radical of an anthraquinone dye.
27. A reactive dye according to claim 4, wherein D is the radical of an anthraquinone dye.
28. A reactive dye according to claim 2, wherein D is the radical of a phthalocyanine dye.
29. A reactive dye according to claim 3, wherein D is the radical of a phthalocyanine dye.
30. A reactive dye according to claim 4, wherein D is the radical of a phthalocyanine dye.
31. A reactive dye according to claim 2, wherein D is the radical of a dioxazine dye.
32. A reactive dye according to claim 3, wherein D is the radical of a dioxazine dye.
33. A reactive dye according to claim 4, wherein D is the radical of a dioxazine dye.

* * * * *